(12) United States Patent
Pau et al.

(10) Patent No.: US 10,718,889 B2
(45) Date of Patent: Jul. 21, 2020

(54) THIN-FILM BROADBAND AND WIDE-ANGLE DEVICES FOR GENERATING AND SAMPLING POLARIZATION STATES

(71) Applicant: The Arizona Board of Regents on Behalf of the University of Arizona, Tucson, AZ (US)

(72) Inventors: Stanley Pau, Tucson, AZ (US); Wei-Liang Hsu, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/299,066

(22) Filed: Mar. 11, 2019

(65) Prior Publication Data
US 2020/0025990 A1    Jan. 23, 2020

Related U.S. Application Data

(63) Continuation of application No. 14/953,272, filed on Nov. 27, 2015, now Pat. No. 10,254,453, which is a (Continued)

(51) Int. Cl.
*G02B 5/30* (2006.01)
*G01J 4/04* (2006.01)
(Continued)

(52) U.S. Cl.
CPC .......... *G02B 5/3016* (2013.01); *C09K 19/38* (2013.01); *C09K 19/56* (2013.01); *G01J 4/04* (2013.01);
(Continued)

(58) Field of Classification Search
CPC .. C09K 19/38; C09K 19/56; G01J 4/04; G01J 2004/001; G02F 1/133703;
(Continued)

(56) References Cited

U.S. PATENT DOCUMENTS 3,971,065 A    7/1976  Bayer
4,208,106 A    6/1980  Oh
(Continued)

OTHER PUBLICATIONS

International Search Report and Written Opinion from International Application No. PCT/US2014/039778, dated Apr. 28, 2015, 11 pages.
(Continued)

*Primary Examiner* — Nathanael R Briggs
(74) *Attorney, Agent, or Firm* — Klarquist Sparkman, LLP

(57) ABSTRACT

Exemplary thin-film optical devices have first and second layer groups disposed as a layer stack on a substrate. The first layer group comprises a first PPN layer, a first LCP layer, and a first barrier layer all superposed. The second layer group is superposed relative to the first layer group, and includes a second PPN layer, a second LCP layer, and a second barrier layer all superposed. The first and second layer groups cooperate to polarize multiple wavelengths of an incident light flux in a broadband and/or wide-angle manner Each of the layer groups has an alignment layer, a respective liquid-crystal polymer layer, and a barrier layer.

20 Claims, 16 Drawing Sheets

Related U.S. Application Data continuation of application No. PCT/US2014/039778, filed on May 28, 2014, which is a continuation-in-part of application No. 13/287,910, filed on Nov. 2, 2011, now Pat. No. 8,866,997.

(60) Provisional application No. 61/828,064, filed on May 28, 2013, provisional application No. 61/516,621, filed on Apr. 5, 2011, provisional application No. 61/828,064, filed on Nov. 2, 2010.

(51) Int. Cl.
| | | |
|---|---|---|
| *C09K 19/38* | (2006.01) | |
| *C09K 19/56* | (2006.01) | |
| *G02F 1/1337* | (2006.01) | |
| *G02F 1/1335* | (2006.01) | |
| *G01J 4/00* | (2006.01) | |

(52) U.S. Cl.
CPC ..... *G02B 5/3058* (2013.01); *G02F 1/133703* (2013.01); *G01J 2004/001* (2013.01); *G02F 1/133528* (2013.01); *G02F 1/133788* (2013.01); *G02F 2201/16* (2013.01); *G02F 2203/04* (2013.01)

(58) Field of Classification Search
CPC ......... G02F 1/133528; G02F 1/133788; G02F 2201/16; G02F 2203/04; G02B 5/3016
See application file for complete search history.

(56) References Cited

U.S. PATENT DOCUMENTS

| | | | |
|---|---|---|---|
| 4,832,462 A | 5/1989 | Clark et al. | |
| 4,838,662 A | 6/1989 | Hilsum et al. | |
| 5,389,698 A | 2/1995 | Chigrinov et al. | |
| 5,532,852 A | 7/1996 | Kalmanash | |
| 5,602,661 A | 2/1997 | Schadt et al. | |
| 6,160,597 A * | 12/2000 | Schadt et al. | C08F 246/00 349/98 |
| 6,496,239 B2 | 12/2002 | Seiberle | |
| 6,624,863 B1 | 9/2003 | Jacobs et al. | |
| 6,744,481 B2 | 6/2004 | Cheng | |
| 6,783,900 B2 | 8/2004 | Venkataraman | |
| 7,009,190 B1 | 3/2006 | Stephenson, III et al. | |
| 7,230,717 B2 | 6/2007 | Brock et al. | |
| 7,440,044 B2 | 10/2008 | Peterson et al. | |
| 8,186,573 B2 | 5/2012 | Callegari et al. | |
| 8,262,274 B2 | 9/2012 | Kim et al. | |
| 2002/0163616 A1 | 11/2002 | Jones et al. | |
| 2004/0212296 A1 | 10/2004 | Nakamura et al. | |
| 2006/0092370 A1 | 5/2006 | Lu | |
| 2006/0226421 A1 | 10/2006 | Fujiwara et al. | |
| 2007/0188696 A1 * | 8/2007 | Kim et al. | G02F 1/13363 349/156 |
| 2007/0248840 A1 | 10/2007 | Lin et al. | |
| 2008/0001120 A1 | 1/2008 | Peglow et al. | |
| 2009/0142476 A1 | 1/2009 | Padiyath et al. | |
| 2010/0060844 A1 | 3/2010 | Sawatari et al. | |
| 2010/0141881 A1 | 6/2010 | Batistatos et al. | |
| 2011/0007255 A1 | 1/2011 | Yaroshchuk et al. | |
| 2011/0017838 A1 | 1/2011 | Delbaere et al. | |
| 2011/0101848 A1 | 5/2011 | Cormier et al. | |
| 2011/0299001 A1 | 12/2011 | Banin et al. | |
| 2012/0050650 A1 | 3/2012 | Liu et al. | |
| 2012/0105783 A1 | 5/2012 | Pau et al. | |
| 2014/0340626 A1 | 11/2014 | Schadt et al. | |
| 2017/0220201 A1 | 8/2017 | Ludwig | |

OTHER PUBLICATIONS

Myhre et al., "Imaging Capability of Patterned Liquid Crystals," Applied Optics 48(32):6152-6158 (2009).

Myhre et al., "Liquid crystal polymer full-stokes division of focal plane polarimeter," *Optics Express*, 20:1-17 (Dec. 2012).

Myhre et al., "Patterned Color Liquid Crystal Polymer Polarizers," Optics Express 18(26):27777-27786 (2010).

Zanchetta et al., "Right-handed double-helix ultrashort DNA yields chiral nematic phases with both right- and left-handed director twist," PNAS 107-41:17497-17502 (Oct. 12, 2010).

Zanchetta et al., "Physical Polymerization and Liquid Crystallization of RNA Oligomers," J. Am. Chem. Soc. 130:12864-12865 (2008).

* cited by examiner

| $404_{11}$ | | | | $404_{15}$ |
|---|---|---|---|---|
| $404_{21}$ | | | | |
| $404_{31}$ | | | | |
| $404_{41}$ | | | | $404_{45}$ |

…

THIN-FILM BROADBAND AND WIDE-ANGLE DEVICES FOR GENERATING AND SAMPLING POLARIZATION STATES

CROSS-REFERENCE TO RELATED APPLICATIONS

This application is a continuation of U.S. application Ser. No. 14/953,272, filed Nov. 27, 2015, which is a continuation of International Application No. PCT/US2014/039778, filed May 28, 2014, which is a continuation-in-part of U.S. patent application Ser. No. 13/287,910, filed on Nov. 2, 2011, which claims the benefit of U.S. Provisional Patent Application No. 61/456,184, filed Nov. 2, 2010, and U.S. Provisional Patent Application No. 61/516,621, filed Apr. 5, 2011. International Application No. PCT/US2014/039778 also claims the benefit of U.S. Provisional Patent Application No. 61/828,064, filed May 28, 2013. All of these applications are incorporated herein by reference in their respective entireties.

ACKNOWLEDGMENT OF GOVERNMENT SUPPORT

This invention was made with government support under Grant No. FA9550-09-1-0669 awarded by USAF/AFOSR and Grant No. FA8651-13-M-0085 awarded by Air Force Material Command (AFMCLO/JAZ). The government has certain rights in the invention.

FIELD

The disclosure pertains to thin-film optical devices such as polarizers, polarimeters, and polarized light emitters.

BACKGROUND

Polarization is one of the primary attributes of an optical field. Techniques for generating polarized light and measuring polarization states of light have been studied for decades. Conventional technologies usually work only at single respective wavelengths of light. For example, in a conventional full-Stokes division of a focal-plane polarimeter, a retarder layer and a linear polarizer layer are utilized in combination with a focal plane array. Different combinations of retarder and polarizer orientations transmit different respective polarization states to respective underlying imaging pixels. (For example, a macro-pixel usually comprises a 0°, a 45°, a right-hand circular, and a 90° polarizer.) However, retardance conferred by a single retarder layer is a function of wavelength. Therefore, a polarimeter comprising a conventional focal-plane array can sample polarization states only at single specific wavelengths within a limited band. These polarimeters have applications in a limited wavelength range and can require long exposure times because most of the light signals outside the wavelength range are filtered out.

U.S. patent application Ser. No. 13/287,910, (the "'910 application") referenced above, discloses, inter alia, polarizers and methods for producing them. The polarizers comprise photopolymers having molecular orientations established by exposure to linear polarized radiation (e.g., linearly polarized UV light). For example, on a substrate surface a first alignment layer defines at least one respective alignment direction, wherein the first alignment layer comprises a respective photo-orientable polymer network (PPN). A first liquid crystal polymer (LCP) layer is situated on or proximate the first alignment layer so that the LCP (including at least one guest material) is aligned with the PPN. A first barrier layer is disposed on the first LCP layer to protect the underlying layers. These first layers comprise a first polarization layer group configured as, for example, a polarizer. A second alignment layer is proximate the first barrier layer, wherein the second alignment layer comprises a respective PPN defining a respective alignment direction. A second LCP layer is proximate the second alignment layer so that second LCP (with respective guest material) is aligned with the alignment direction(s) of the second alignment layer. A second barrier layer is disposed on the second LCP layer. The second layers comprise a second polarization layer group configured as, for example, a retarder. A polarizer device having such a multilayer structure can extend uniformly (e.g., over the surface of the substrate) or can be formed as a "pattern," i.e., in multiple discrete zones on the substrate.

Light-polarizing devices are also described in the '991 application, of which an example comprises a substrate, a first polarization group of layers on the substrate, and at least a second group of polarizing layers. The groups of polarizing layers comprise respective alignment layers, LCP layers, and barrier layers, formed as summarized above.

Polarized-light emitters are also described in the '910 application, of which an example comprises a substrate and a first group of polarizing layers supported by the substrate. The first group comprises a respective alignment layer, a respective LCP layer, and a respective barrier layer. The LCP layer comprises a LCP material and one or more anisotropic fluorophores that are aligned with the alignment layer. A second polarization layer group defining a retarder can be situated relative to the substrate. Application of fluorescence-excitation energy, such as ultraviolet light or electrical current, causes the fluorophores to fluoresce. At least a portion of the fluorescent light can be transmitted through the LCP layer. At least a portion of the fluorescent light can be reflected back to the LCP layer in which the fluorescent light in a particular polarization state is absorbed by the aligned fluorophores.

Whereas the devices summarized above are useful for many applications, certain applications are unmet or poorly met by them. For example, there are current needs for polarizer-based devices that are operable over wider ranges of light wavelength; i.e., so-called "broadband" ranges. Example broadband devices include, but are not limited to, polarizers, polarimeters, retarders and other waveplates; polarized-light emitters, displays, and cameras.

As used herein, "broadband" means an ability to operate at a wide bandwidth that covers a useful range of the spectrum. For example, a broadband or achromatic wave plate can operate with flat retardance in a wavelength range of 260-410 nm, 400-800 nm, 690-1200 nm, or 1100-2000 nm. Other wavelength ranges are also possible. For such devices, the wavelength-dependence of the retardation is nearly flat (less than 0.05-0.1 wave deviation) over the entire operating wavelength range. In comparison, a narrow-band wave plate can operate in the range of, for example, 550-650 nm (centered at 600 nm) with a wavelength dependence of the retardation being less than 0.1 wave deviation across the operating wavelength range. It will be understood that operability in a broadband manner (e.g., in any of the broadband ranges noted above) generally includes operability in any of various narrower sub-ranges within the breadth of the broadband range. For example, a broadband device operable in the range of 260-410 nm is also operable in the range of 270-280 nm, which is a sub-range of the broadband range.

There are also current needs for polarizer-based devices that are operable over wider angles than currently available (or provided), particularly for improving displays. As used herein, "wide-angle" means viewing angle greater than 160 degrees. An example of the viewing angle of a twisted nematic liquid-crystal display (LCD) ranges from 160-170 degrees.

For many applications, such as light imaging, detecting, and display, there is a need for retarders, polarizers, and polarized-light emitters that can operate at multiple wavelengths and angles. For example, it would be useful if full-Stokes division-of-focal-plane (DoFP) polarimeters were available for operation at multiple wavelengths in the electromagnetic spectrum (e.g., in the visible spectrum (400-700 nm)) and at wider than conventional angles of incident light. In sensors, broadband operation would be useful for increasing the amount of light reaching individual sensor elements or for producing larger signals. Because the angle of incidence of incoming light rays on a sensor is affected by the locations of upstream optics, wider-angle operation would accommodate a greater range of lens focal-lengths and lens-object separations than currently. In displays, patterned sets of broadband retarders and polarizers would be useful for emitting light at multiple wavelengths at wide viewing angles in a patterned array such as an array of display pixels. This is because most displays need to operate in more than one color and must be visible at more than one angle.

SUMMARY

Various embodiments described below are thin-film devices that incorporate and exploit multilayer structures (i.e., comprising multiple polarization layer groups: PPN/LCP/barrier layer) as disclosed in the '910 application into thin-film polarization devices to generate and/or sample light-polarization states over a broad band (wide wavelength range) and over wider angles than are currently available (or provided). These devices are in contrast with thin-film devices having only one or two polarization layer groups that collectively are optimized for and operate at a single wavelength and/or angle. By adding at least a third polarization layer group, thin-film devices are provided that operate at multiple wavelengths and/or angles. For many applications, such as imaging and display, the thin-film devices comprise at least one retarder layer group and at least one polarizer layer group. For example, in a division-of-focal-plane (DoFP) polarimeter, a set of multiple retarders and at least one polarizer can enable operation in a defined range of electromagnetic radiation (e.g., in the visible spectrum (400-700 nm)) and at wide angles. Broadband operation allows more light or signals to reach a sensor. Since the angle of incidence of incoming light rays on the sensor depends generally on the lens and object locations, wide-angle operation accommodates a greater range of lens focal length and lens-object separation.

The retarders and polarizers can be "uniform," by which is meant not patterned. Patterned retarders and polarizers can be made by lithography and etching of thin films (see U.S. Pat. No. 5,844,717).

The multilayer PPN/LCP/barrier structures of the devices described herein are the result of simple fabrication techniques that provide alternative fabrication techniques for producing broadband retarders and polarizers exhibiting high spatial resolution with arbitrary retardance and polarizations. The structures can be made flat ((i.e., lacking significant surface topography) to reduce light scattering and increase extinction ratio. The presence of the barrier layer(s) protects the optical layers from degradation and prolongs the operating lifetime of the device. Examples of a barrier layer, not intending to be limiting, are silicon dioxide, optical cement, parylene, and an index-matching polymer. The thickness of the barrier layer can range from 50 to 500 nm. In certain cases, the barrier layer can also serve as a polarization layer to reduce optical scattering and as an antireflection layer to improve light transmission.

Broadband retarders can also be fabricated using twisted nematic liquid crystal polymer. One or more layers of nematic liquid crystal can be used without twisted structures and with barrier layers located between the structures. The structures are optimized for both broadband and high-angle operations.

A distinct advantage of the devices and methods set forth herein is that thin-film devices capable only of narrow-band and/or narrow-angle operation can be converted to wide-angle or wide-band simply by adding at least one additional polarization layer group. For example, a narrow-band device comprising a polarizing layer and one retarder can be converted to a broadband device simply by adding a second retarder (comprising a respective alignment layer, at least one respective LCP layer, and a respective barrier layer if required).

The various embodiments are not limited to sensing or emitting in only the visible spectrum; rather, the embodiments can also be applied to other wavelength ranges such as near-, short-, mid-, and far-infrared wavelengths.

As noted, at least two aspects are described herein. The first aspect is the application of the broadband patternable micropolarizer based on a multi-layer structure of retarders and polarizer to construct a polarization detector, e.g., a polarization camera or imaging polarimeter. The second aspect is the application of broadband patternable micropolarizers to create broadband light of a predetermined polarization state.

The foregoing aspects of the disclosed technology will become more apparent from the following detailed description, which proceeds with reference to the accompanying figures.

DETAILED DESCRIPTION

General Considerations

Figure 1:
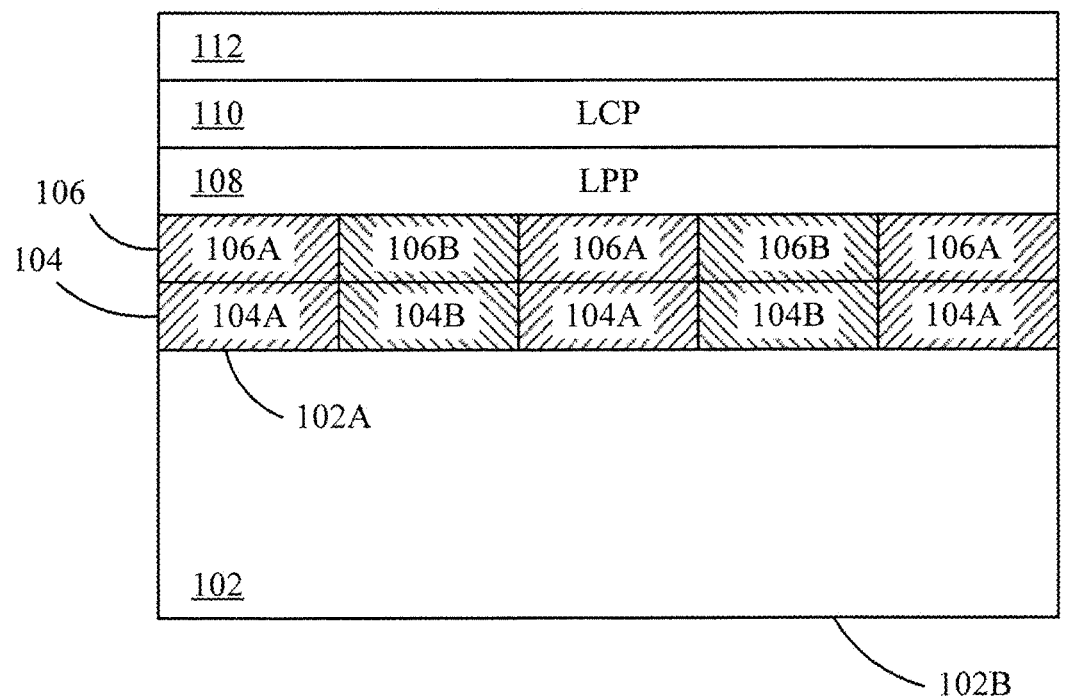
FIG. 1 is a sectional view of a representative embodiment of a liquid crystal polymer (LCP)-based patterned device.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Photo-Oriented Polymer Networks

Patterned and oriented arrangements of anisotropic molecules and/or microcrystals or nanocrystals on a substrate have many applications in optical and electronic devices. One application is based on photo-oriented polymer networks (PPNs), wherein a PPN can be used as an alignment layer in a liquid crystal guest-host system. The PPN is aligned using polarized ultraviolet (UV) light. UV exposure need not be applied over the entire PPN-coated substrate; rather, the exposure itself can be "patterned," e.g., using microlithographic techniques, as described in U.S. Pat. Nos. 5,389,698 and 6,496,239. After forming the alignment layer, a layer of a liquid crystal in a polymer (LCP) is formed superposedly on the aligned PPN layer to allow the LCP (and guest material in the LCP) to align with the PPN. The LCP is often applied as a liquid solution of the LCP in a suitable solvent. An example guest material comprises functionalized dichroic chromophores, present in a liquid solution of the LCP (referred to as a "host" material) in a suitable solvent. The chromophore(s) must align with the host system in a predetermined way. Another example guest material is a fluorophore: a compound made up of molecules that produce fluorescent light if appropriately energized either by light or by electrical stimulation. The solubility and orientability of the guest-host system depend on the chemistry of the solvent, the liquid crystal material, and the guest chromophores.

In certain embodiments, chromophores, fluorophores, and/or semiconductive polymers exhibit a liquid-crystal phase and can form a polymer film with addition of a photo-initiator and selected monomer. The liquid-crystal phase, consisting primarily of the chromophores and/or semiconductive polymer, can act as both the "guest" and the "host." The polymer film is typically applied as a liquid and subsequently cured in a manner that achieves co-alignment of the guest and host (e.g., alignment with a PPN).

Various guest-host chemical systems described below provide good solubility and orientability of the guest in the host. Also described are various devices that exploit this solubility and orientability. Whereas dichroic dyes (chromophores) can serve as guests, other technologically important classes of materials, such as carbon nanotubes (CNTs), n- and p-type semiconductor polymers, fluorophores, proteins, DNA, RNa, and/or other biological molecules can similarly be used. See, e.g., Zanchetta et al., *PNAS* 107: 17497-17502 (2010), and Zanchetta et al., *JAGS Communications* 130:12864-12865 (2008), both of which are incorporated herein by reference.

A PPN and a guest-host system in polymer solution or uniform dispersion can be deposited on a substrate in a pattern corresponding to a patterned array of CCD and/or CMOS image-sensor elements. The patterned array can be formed by, for example, microlithography. In certain examples, multiple layers of respective aligned guest-host systems can be formed on a substrate to form structures that exploit the respective guest materials and their respective alignments. An example structure is a circular polarizer comprising a dichroic dye guest-host layer and a quarter-wave retarder.

LCPs are also referred to "reactive mesogens," and an LCP layer can include a liquid-crystal material having one or more polymerizable groups such as acrylate groups. For example, the acrylate groups can be associated with acrylate monomers that can be polymerized into films, such as by UV radiation. The resulting cured LCP layer comprises polymers having a "fixed" orientation. These and/or other LCP-layer formulations can be applied to rigid or deformable substrates, such as (but not limited to) glass, plastics, metal foils, or other surfaces.

PPNs are also referred to herein as linear photo-polymerizable polymers (LPPs). In some examples, fluorescent materials can be aligned in a LCP layer in which the fluorescent materials are caused to emit light having a selected state of polarization. These fluorescent materials are referred to herein generically as "fluorophores." An example fluorophore, not intending to be limiting, is a fluorescent dye.

A PPN layer having one or more orientation directions established by single or multiple exposure to respective polarized radiation is referred to herein as an "oriented" or "aligned" PPN layer. The aligned PPN layer is useful for aligning molecules in a LCP layer. Alignment of a LCP layer with an oriented PPN layer can be accomplished even with one or more intervening layers being situated between the PPN layer and LCP layer; actual contact of the PPN and LCP layers with each other is not required.

As summarized above, polarized light for emission can be produced by inducing fluorophore guest material(s) to fluoresce. As used herein, polarized emission refers to emission of which a ratio of optical power (in at least one state of polarization) to total emitted power is at least 0.5, 0.6, 0.7, 0.8, 0.9, or more. Optical devices can be produced for use at visible optical wavelengths between about 400 nm and 700 nm, but devices for longer or shorter wavelengths can also be produced.

Figure 8:
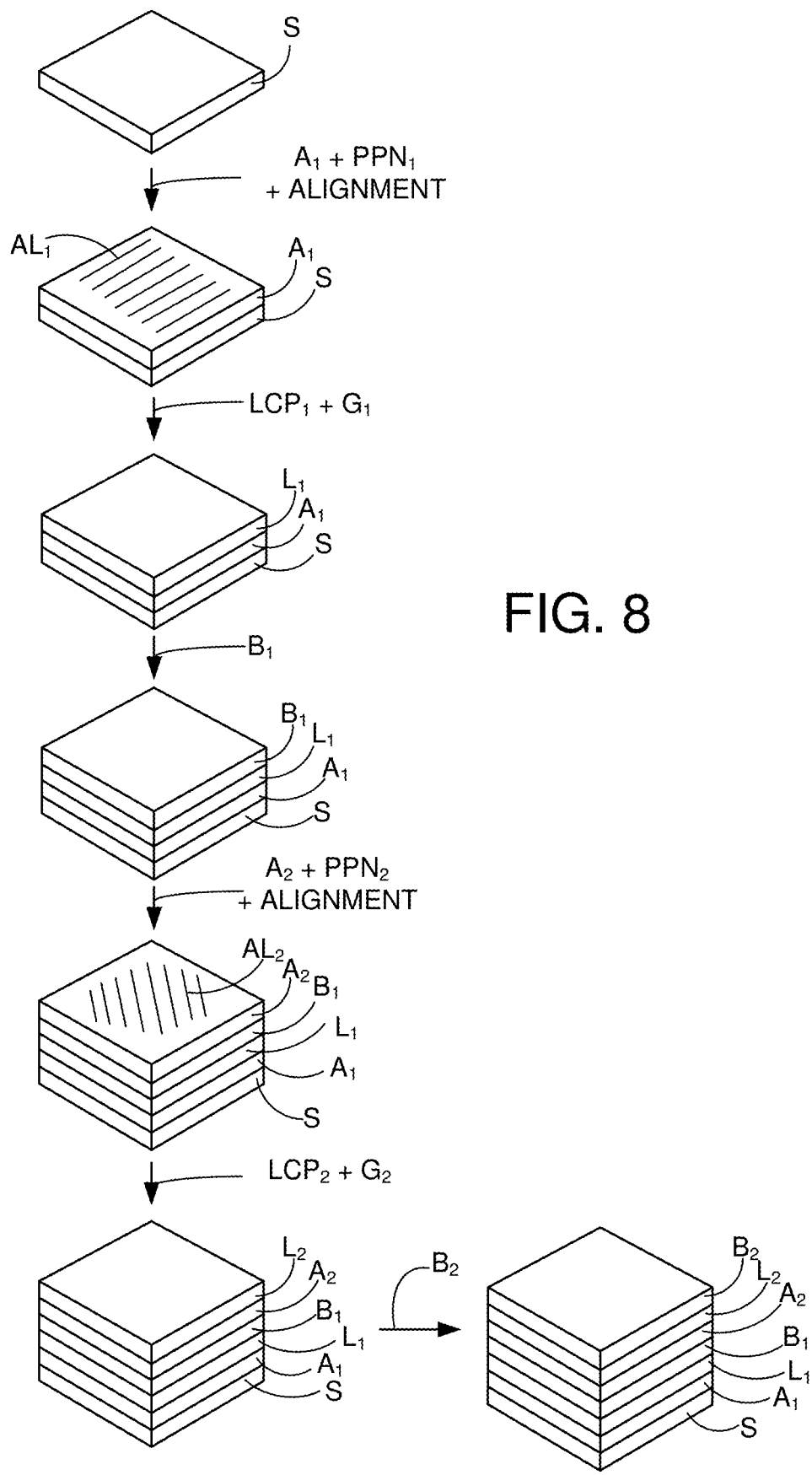
FIG. 8 is a schematic depiction of steps in a representative method for forming a device having a substrate, first and second alignment layers, first and second liquid crystal polymer (LCP) layers, and first and second barrier layers.

Formation of a device having multiple groups of layers is schematically depicted in FIG. 8. Applied to the surface of a substrate S is a first alignment layer $A_1$ (which includes a corresponding $PPN_1$). Forming the first alignment layer $A_1$ includes aligning the PPNs of the layer according to a first orientation $AL_1$. A first liquid crystal polymer layer $L_1$ (with guest $G_1$) is formed superposedly relative to the first alignment layer $A_1$ so that the liquid crystal polymer molecules $LCP_1$ (and guest material $G_1$) can be aligned according to the first orientation $AL_1$. A first barrier layer $B_1$ is then formed. A second alignment layer $A_2$ is formed (including the corresponding $PPN_2$) by applying the $PPN_2$ and aligning them according to a second orientation $AL_2$. A second liquid crystal polymer layer $L_2$ (with guest $G_2$) is formed superposedly to the second alignment layer $A_2$, and the polymers are caused to become coaligned according to the second pattern $AL_2$. A second barrier layer $B_2$ is then applied to, inter alia, protect the underlying layers.

Although FIG. 8 shows the layers $A_1$, $A_2$ as being continuous, it will be understood that these layers (and/or their respective liquid crystal polymer layers $L_1$, $L_2$) can be formed according to respective patterns, e.g., to form a sensor array or to be arrayed according to a pattern of an existing sensor array. It will also be understood that the depicted layers can include one or more intervening layers.

Figure 9:
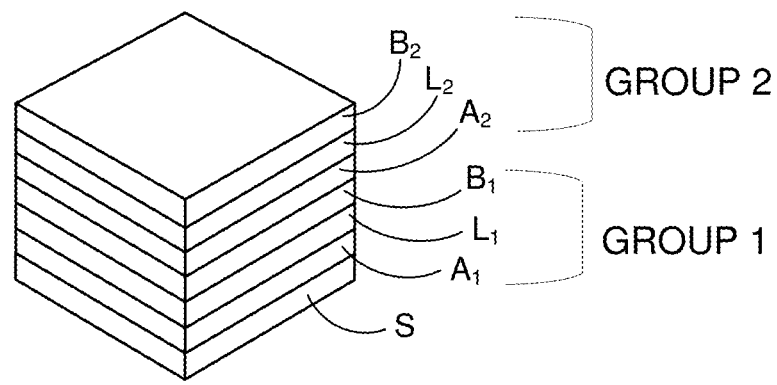
FIG. 9 is a schematic depiction of a region of a device having two groups of polarization layers.

FIG. 9 is a schematic view of a representative structure that can be formed by the method shown schematically in FIG. 8. Note that the layers $A_1$, $L_1$, $B_1$ comprise a first group of polarization layers, and the layers $A_2$, $L_2$, $B_2$ comprise a second group of polarization layers, both groups being supported by a substrate S. In this structure, each group includes its own barrier layer.

Representative Embodiments of LCP-Based Patterned Devices

A first representative embodiment of a LCP-based patterned device is shown in FIG. 1. A substrate 102 having planar surfaces 102A, 102B is coated with an LPP layer 104 applied to the surface 102A. The substrate 102 can be glass, fused silica, silicon, germanium, or any other material suitable for a particular application. Some applications, for example, requiring high transmission of visible light are advantageously formed on optically transparent substrates. Alternatively, an electrically conductive substrate, or a light-absorbing or light-blocking substrate can be used. Although not shown in FIG. 1, the substrate 102 can include other coatings and/or surface treatments, wherein the LPP layer 104 is situated on a selected coating or surface treatment. For example, an electrically conductive coating, such as a metallic coating, can be applied to the surface 102A. In other examples, the coating can be both optically transparent and electrically conductive, such as an indium tin oxide (ITO) coating.

The LPP layer 104 can be patterned by exposure to light that is linearly polarized in one or more orientations. Such exposure can be achieved using one or more pattern-exposure masks. The resulting LPP layer 104 can have a spatially variable orientation suitable for achieving co-alignment of liquid crystal material (in a suitable polymer solution) in a subsequently applied LCP layer 106. The LCP layer 106 can include, in addition to the liquid crystal material which serves as a host, a guest such as a dichroic dye, a fluorescent dye or other fluorophore, an organic semiconductor, carbon nanotubes, or other material that can be induced to align with the liquid crystal material.

As shown in FIG. 1, the LPP layer 104 defines multiple regions 104A, 104B having similar or respectively different alignments, according to the intended function of the device. Different alignments can be achieved by selective exposure of the layer to respectively different linear polarizations of UV radiation. The LCP layer 106 has corresponding alignment regions 106A, 106B. As an example, in FIG. 1, alignments in the regions 106A, 106B are mutually orthogonal; but, other alignments are possible.

While many applications can be addressed using a single guest-host layer group such as the alignment layer 104 and corresponding LCP layer 106, one or more additional guest-host layer groups can be provided, with or without respective alignment layers (a single alignment layer can be used to achieve alignment of multiple LCP layers in different respective groups). In the FIG. 1 embodiment, a second LPP layer (alignment layer) 108 is situated on a first LCP layer 106, and a second LCP layer 110 aligned in direction(s) established by the second LPP layer 108. Thus, two layer groups are formed, each comprising a respective LPP layer and respective LCP layer. The LPP layers 104, 108 can be processed differently to achieve different orientations thereof, according to different patterns. Alternatively to the depicted configuration, the second LPP layer 108 can be omitted, wherein the second LCP layer 110 aligns in response to alignment directions established by the first LPP layer 104. The second LCP layer 110 can include the same or a different guest material as the first LCP layer 106; alternatively, the second LCP layer 110 can include no guest material at all. For example, the second LCP layer 110 can be configured to serve as an optical retarder, and the first LCP layer 106 can be configured to provide a suitable retardance based on layer thickness.

In other embodiments additional LCP layers (and LPP layers) can be added to the configuration shown in FIG. 1. These additional layers can include one or more respective metallic or semiconductor materials, for example. An important additional layer in many embodiments is a barrier layer. Respective barrier layers (each comprising a respective protective material) desirably are situated between layer groups. For example, a first barrier layer can be located between the first LCP layer 106 and the second alignment layer 108, and a second barrier layer can be located on the second LCP layer 110. Respective barrier layers can be used separate LCP layers of respective layer groups and/or alignment layers of respective layer groups.

A given device can include multiple substrates, such as a second substrate 112. If desired, an alignment layer (e.g., a respective orientated LPP layer or a conventional rubbed polyimide layer) can be provided at the surface of the second substrate 112. In the configuration shown in FIG. 1, the second LPP layer 108 provides a uniform respective orientation, to which the second LCP layer 110 has common alignment. The second LCP layer 110 can include one or more guest materials, such as fluorophores, carbon nanotubes, or other materials. The LCP layers 106, 110 can include the same or respectively different guest materials; alternatively, one or both LCP layers can have no guest material at all. Typically, LPP and LCP layers exhibit birefringence, and optical retarders with spatially varying optical axes can be formed without using a guest material in a LCP layer.

Figure 2A:
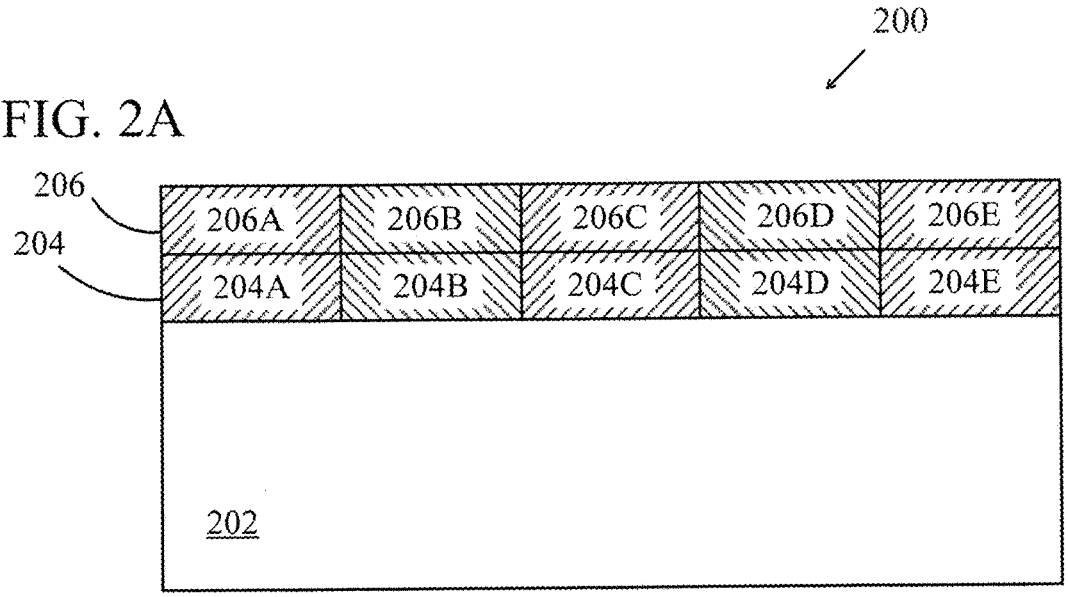
FIGS. 2A-2B are plan and sectional views, respectively, of a representative embodiment of a patterned photo-oriented polymer network (PPN)/LCP device in which the pattern elements are arranged in rows and columns.
Figure 2B:
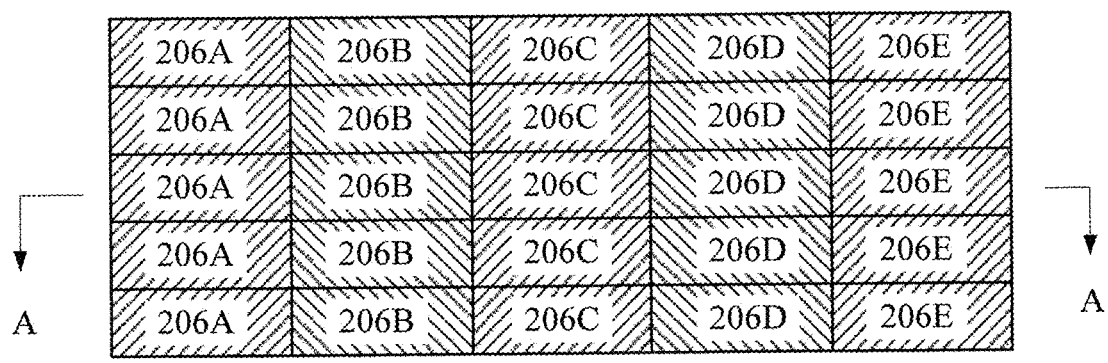

A representative embodiment of a patterned single-layer-group device 200 is shown in FIGS. 2A-2B. The device includes a substrate 202, an LPP alignment layer 204, and an LCP layer 206. The alignment layer 204 is segmented (patterned) into an exemplary five-by-five array of pattern regions that define five LCP regions 206A-206E each of which can have a different alignment. More or fewer pattern regions can be provided (a five-by-five array is used here for convenient illustration). In various examples, all pattern regions in one or more selected rows or columns have similar alignments, while adjacent rows or columns have different alignments. Other examples are possible having other respective arrangements of alignment directions. The LCP layer 206 in each region can include one or more guest materials such as one or more fluorophores, dichroic dyes, carbon nanotubes, organic semiconductors, or other guest materials, which can be similar or different in each region. The alignment layer 204 is divided into alignment regions 204A-204E for alignment of the respective LCP regions 206A-206E.

Methods for Fabricating Devices Having at Least One Layer Group

Figure 3:
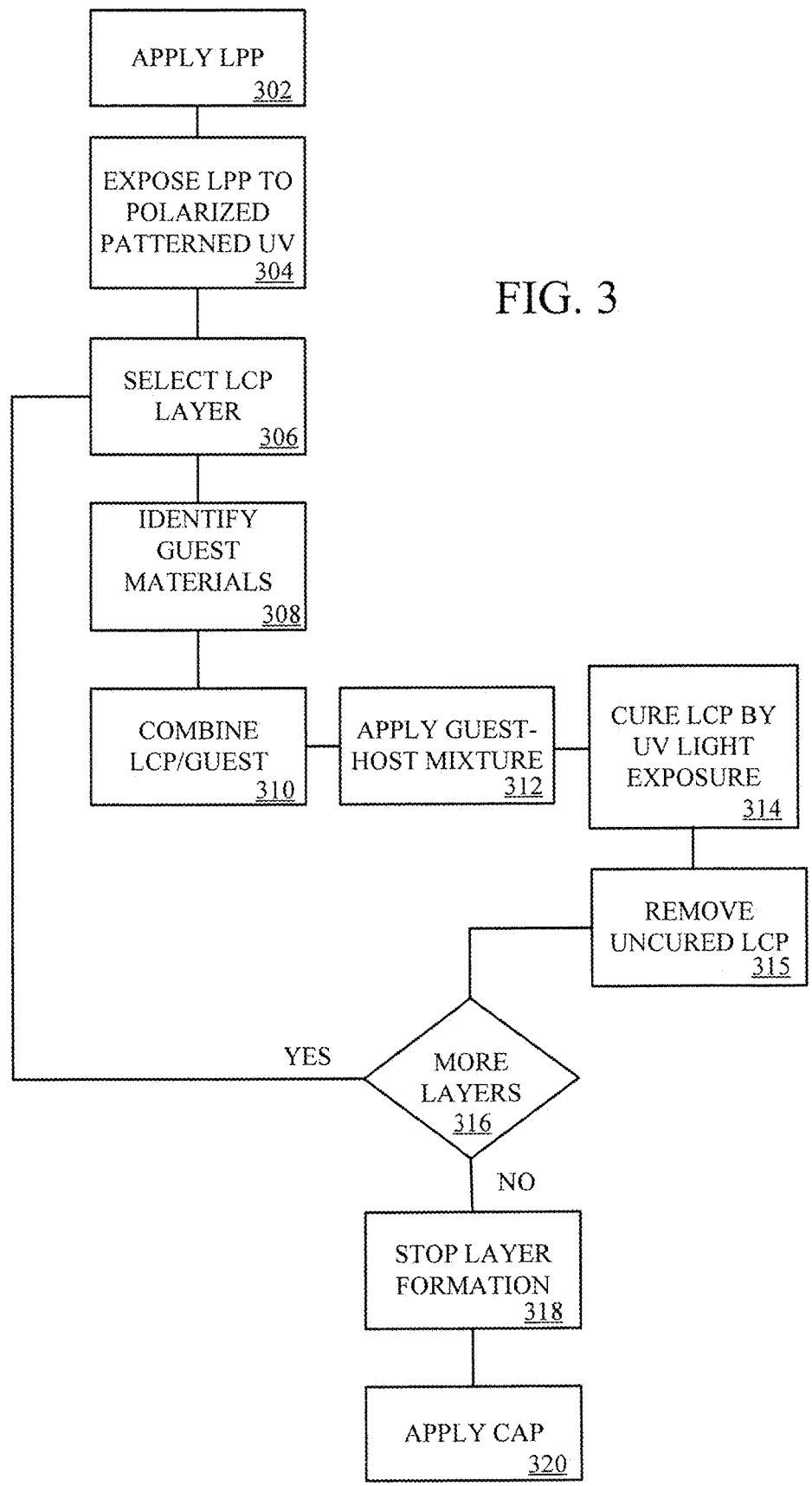
FIG. 3 is a block diagram of a representative embodiment of a method for fabricating linear polarizable polymer (LPP)/LCP devices.

A representative fabrication method is illustrated in FIG. 3. At 302, an LPP layer is applied to the surface of a substrate by spin-coating or other suitable process. The LPP layer is destined to become an alignment layer. If the substrate surface is not planar, it may be planarized before forming the LPP layer. At 304, the LPP layer is exposed to patterned linearly polarized light, typically by situating a patterned chrome-on-quartz mask proximate the LPP layer, or by projecting UV light, patterned by passage through a mask, onto the LPP layer to align it. The mask can define transmissive apertures (e.g., regions lacking a chrome coating) for the respective desired pattern. At least one transmissive aperture can include a respective $\lambda/2$ retarder layer that rotates the polarization of incident UV to provide the respective region with a desired selected respective alignment. Alternatively, a series of exposures can be made of different selected apertures to provide the corresponding regions of the LPP layer with desired respective polarization orientations. An LCP material is selected at 306, and one or more suitable guest materials are identified at 308. Guest materials generally have appreciable solubility, typically in range of 1 to 1050 mg/mL in the desired LCP solution. The guest material desirably also is able to continue, after combining it with the LCP, to serve the function for which it was selected. Candidate guest materials having little to no solubility in the LCP solution typically fail to be present in sufficient concentration in the LCP layer for the intended type of device. Some fluorescent guest materials exhibit substantially reduced quantum efficiency due to quenching or other phenomenon when the guest material is included in an LCP layer. A selected guest material is added to the LCP material at 310, and at 312 the resulting mixture is coated onto the LPP layer by spin-coating or other technique. At 314, the LCP layer is cured by exposure to UV radiation. Regions not completely cured can be removed by solvent at 315. At 316, additional layers are selected, and layer selection and formation continues at 302. Additional layers of LCP and/or LPP can be applied in the same manner as described above, with the same or different patterns and guest materials. If all desired layers have been formed, at 318, LPP/LCP layer formation stops. At 320, a barrier layer is provided, typically using a UV-curable optical adhesive, to cover and enclose the LPP (alignment) layers and LCP layers except at layer edges. Whereas a LPP layer usually can provide alignments that are more reproducible and more readily patterned for LC alignment than conventional rubbed alignment layers (e.g., rubbed polyimide layers), the alignment layer(s) used in the method described above can be a rubbed layer, particularly if patterning of the alignment layer is not likely to be required.

Example 1: Micropolarizer on a Sensor Array

A micropolarizer array can be fabricated directly on an imaging sensor, such as a charge-coupled device (CCD), a complementary metal-oxide-semiconductor (CMOS) sensor, or a display device, such as a liquid-crystal display (LCD), organic light-emitting diode (OLED) display, or plasma display. A representative device is illustrated in FIG.

4, in which a CCD 402 includes an array 404 of pixels $404_{i,j}$, where I, J are integers that refer to row and column number, respectively, of respective pixels. For color-image sensors, the pixels $404_{i,j}$ can include two or more color elements; usually, each pixel $404_{i,j}$ includes a collection of four color elements. Of the four color elements, at least a respective one is associated with each of red (R), green (B), or blue (B) colors established by respective color filters. Here, a "pixel" can refer to any of multiple sensor elements (e.g., red, green, and blue color elements in a Bayer color arrangement), any of various regions of an image, or any of multiple sensor elements that are part of an array of sensor elements. Image sensors and arrangements of color filters for such sensors are described in U.S. Pat. Nos. 3,971,065 and 6,783,900, and in Dillon et al., *IEEE Trans. Electron. Devices* 25:97 (1978), all of which are incorporated herein by reference.

The image sensor 402 can have a planar or other exterior surface on which a passivation layer 412 or other protective coating, such as a light-transmissive insulator made of BPSG, PSG, silicon dioxide, silicon nitride, polyimide, or other suitable material. The PPN alignment layer 414 is situated on the passivation layer 412, and is patterned by exposure to one or more polarized UV beams that has been patterned by passing through one or more masks. This patterning defines the PPN-orientation directions of the layer, which can vary from pixel to pixel (including from color element to color element in a color image sensor). An LCP layer 416 (including a dichroic dye and/or other guest material) is situated on the LPP layer 414. If desired, a barrier (protective) layer and a layer of microlens can be provided on the LCP layer 416.

Figures 4A, 4B:
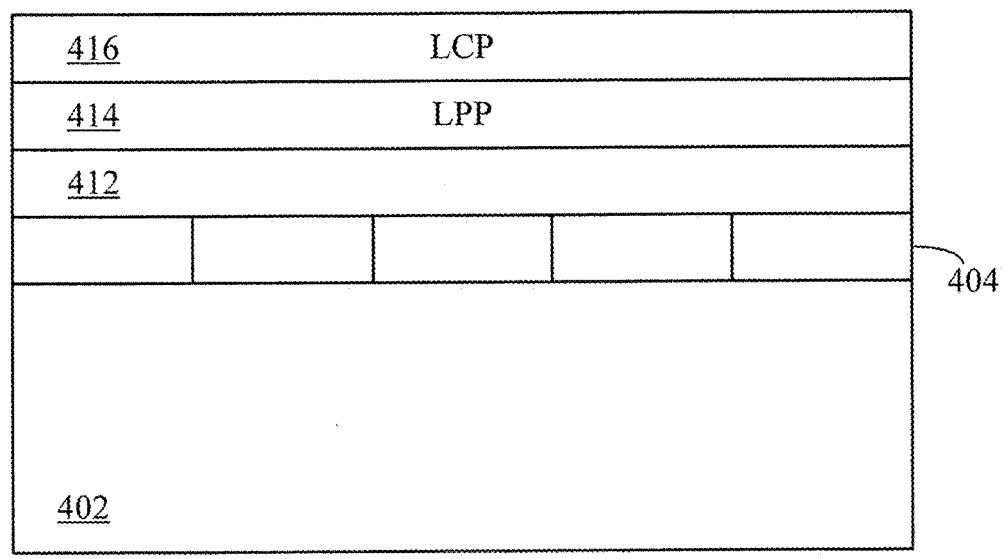
FIGS. 4A-4B are sectional and plan views, respectively, of a CCD image sensor including a patterned LPP/LCP polarizer.

A device as shown in FIG. 4 can be fabricated on an existing image sensor, wherein the various image pixels of the sensor are associated with respective pattern elements of the device to form retarders or polarizers, for example, defined by the patterned LPP/LCP layers. Pattern elements can be aligned based on lithographic mask alignments performed when forming the layers on the sensor. Polarization extinction ratios of at least 2:1, 5:1, 10:1, 20:1, 50:1, 100:1, or greater are preferred in most applications.

Example 2. Polarized-Light Emitters

In this example an LPP-aligned LCP element or device is a polarized light emitter in which the guest material comprises one or more suitable fluorescent dyes. An exemplary fluorescent dye can be selected from the various benzothiadiazole-based fluorescent dyes (these are called "BTD" dyes). Alternatively, the perylene-based dye N,N'-di(pentyl) perylene-3,4,9,10 tetracarboxylic diimide can be used. The perylene-based dye is also an organic semiconductor as discussed in other examples below. Synthesis of these dyes is described in Koge et al., *Chem. Phys. Lett.* 354:173 (2002), incorporated herein by reference.

By incorporating a fluorescent dye as a guest material in the LCP layer, the fluorescent dye co-aligns with the liquid crystal in the LCP, based on orientations produced by UV exposure of the LPP. Subsequent exposure of the aligned fluorophore/LCP guest-host mixture to a suitable electromagnetic radiation (at a wavelength(s) suitable for exciting fluorescence from the fluorophores) produces a substantially polarized fluorescence. Emission intensity can be increased by increasing dye concentration without reducing the extent of polarization of the fluorescence.

In fluorophores in which UV absorption is polarization-dependent as well, an incident UV flux used to excite fluorescence is at least partially polarized after exiting the fluorophore guest-host layer. This polarized UV can be directed through an additional 214 retarder layer to a reflective layer. The flux from the fluorophore layer can then be reflected back to the fluorophore layer through the λ/4 retarder so as be in a state of polarization that is effectively absorbed by the fluorophore to increase fluorescence intensity.

Figure 10:
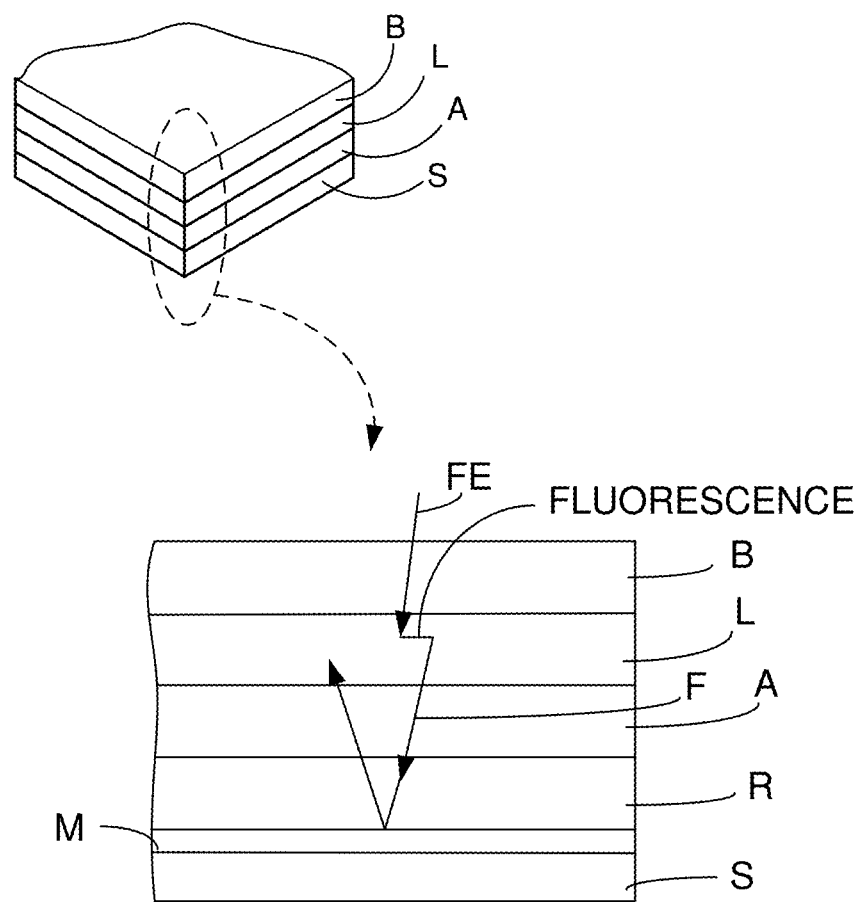
FIG. 10 is a schematic depiction of a region of a polarized light emitter.

FIG. 10 schematically depicts a polarized emitter according to an example configuration. The depicted emitter comprises a substrate S having a reflective surface M. On the substrate is a "stack" of the following layers: a retarder R, an alignment layer A in which the PPNs have a selected orientation, a LCP layer L in which liquid crystal polymers and guest material(s) (fluorophores) are aligned to the alignment layer A. Protecting these layers is a barrier layer B. The depicted structure is one in which production of fluorescent light by the fluorophores is caused by incoming fluorescence-exciting radiation FE. In the liquid crystal polymer layer L, the radiation FE stimulates production of fluorescent light F, which propagates through the retarder R and reflects from the surface M. In this configuration a portion of the incident fluorescence-exciting radiation FE can be transmitted by the LCP layer L to the retarder R and reflective surface M that drive the portion back to the LCP layer L so as to be in a state of polarization that is effectively absorbed by the co-aligned fluorophores.

Example 3: Micropolarizers Comprising Carbon Nanotubes (CNTs)

CNTs can be used as a guest material in an LCP, in which the CNTs are aligned with an LPP layer (alignment layer) as shown generally in the devices discussed above. Example LCPs for use with CNTs are LCPs based on poly (p-phenylene terephthalamide), a compound having alkyl groups and a pyrene group. The CNTs can be single-walled CNTs ("SWCNTs"). A SWCNT/LPP mixture can be made by first dissolving the LCP in cyclopentanone, followed by adding the CNTs. Sonication of the mixture yields a uniform dispersion of the SWCNTs in the LCP. The dispersion can be spin-coated on a suitable substrate (e.g., patterned glass), thereby producing an aligned film of the SWCNTs. In the aligned film the CNTs exhibit polarization properties.

Example 4: Oriented Semiconductors

Any of various organic semiconductors can be utilized as guest materials in LCP. An example n-type organic semiconductor is N,N'-di(pentyl) perylene-3,4,9,10 tetracarboxylic diimide (PTCDI), which produces a polarized emission of yellow light. PTCDI molecules have a strong tendency to aggregate, but when provided as a guest in an LCP, the resulting films of PTCDI/LCP exhibit optical properties similar to films in which the PTCDI is known to be in homogeneous mixture or solution, suggesting that there is actually almost no aggregation. The resulting polarizers have applicability in, for example, polarized organic-LED ("OLED") applications such as OLED displays.

Example 5: Fabrication of Devices Comprising Multiple Layer Groups

Devices can be made that comprise multiple groups of layers, wherein each group comprises at least a respective alignment layer and a respective LCP layer. These groups can provide multiple respective combinations of PPN and LCP, and the groups can be layered successively to generate different optical elements such as color filters and elliptical or circular polarizers. One or more groups can include or omit other materials that nevertheless could be added to the liquid crystal polymer, such as dichroic dyes, fluorescent dyes, or CNTs. An example process for a circular retarder having three LCP layers includes the following steps: (a) formation of a 0-degree aligned LPP layer (first alignment layer); (b) superposedly forming a first LCP layer on the first alignment layer, the first LCP layer having a quarter-wave optical thickness (some oriented LPP layers provide considerable birefringence, and the LCP can be selected in consideration of the retardation provided by the LCP); (c) forming a second LPP layer (second alignment layer) on the quarter-wave LCP layer (the second LPP in this example is aligned at 45 degrees relative to the first alignment layer); (d) coating the second alignment layer with a second LCP layer in which the LCP material is mixed with a dichroic "guest" material, thereby forming a 45-degree linear polarizer; (e) forming a third LPP layer (third alignment layer) on the second LCP layer, the third alignment layer being aligned at 90 degrees relative to the first alignment layer; and (f) forming on the third alignment layer a third LCP layer providing quarter-wave retardation. Desirably, the three layer groups are separated from each other in this "stack" of layers by respective barrier layers.

This three-layer-group structure (quarter-wave retarder/linear polarizer at 45 degrees/quarter-wave retarder) forms a left-handed circular polarizer, and can be referred to as a homogeneous circular polarizer.

Example 6. Additional Guest Materials

While some examples are described herein with reference to particular guest materials such as fluorophores, dyes, or n- and p-type organic semiconductors, other guest materials can be utilized in certain applications. Examples are depicted below in Formula 1A and Formula 1B:

Formula 1A

Formula 1B

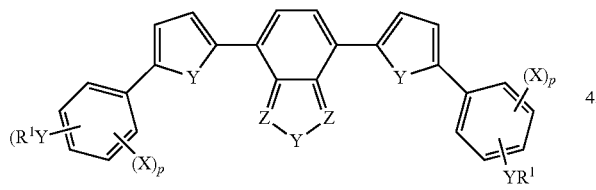

In Formulas 1A and 1B, each Y independently may independently be an oxygen atom or a sulfur atom. In the $NR^4$ groups, each $R^4$ may independently be a hydrogen, an aliphatic, an aryl, a heteroaryl, or a heteroaliphatic. Each $R^1$ may independently be an aliphatic or aryl, more typically an alkyl (cyclic or acyclic), alkenyl (cyclic or acyclic), or alkynyl, even more specifically a $C_1$-$C_{10}$ alkyl, a $C_1$-$C_{10}$ alkenyl, or a $C_1$-$C_{10}$ alkynyl. In preferred embodiments, Formula 1A encompasses compounds in which $R^1$ is a $C_8$ alkyl, and Formula 1B encompasses compounds in which $R^1$ is a $C_4$ alkyl. X may be a halogen (independently a bromine, a chlorine, a fluorine, or an iodine), and p may range from 0 to about 4. Particular disclosed embodiments have Formulas 1C and 1D, illustrated below.

Formula 1C

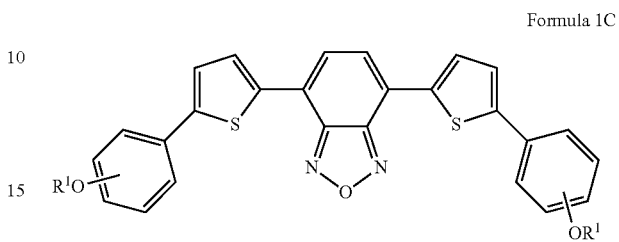

Formula 1D

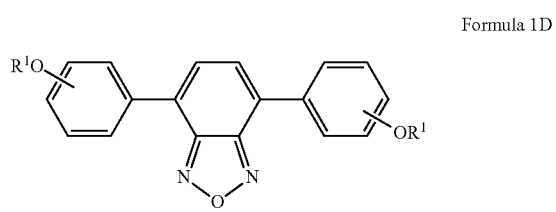

Formula 2

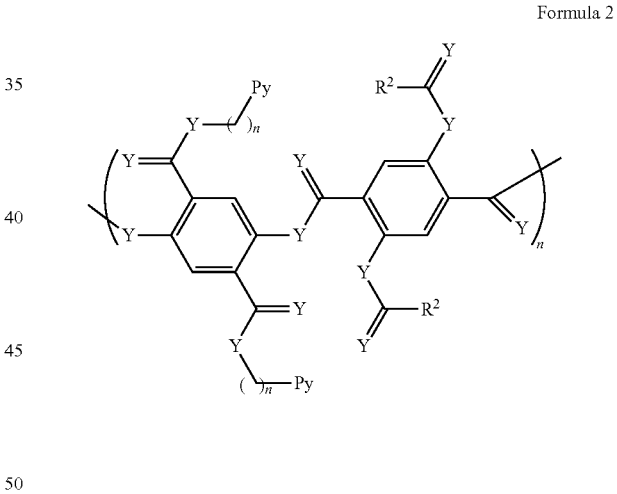

In Formula 2, above, each Y independently may be selected from oxygen, sulfur, and $NR^4$ wherein $R^4$ may be selected from hydrogen, aliphatic, aryl, heteroaryl, and heteroaliphatic. $R^2$ may independently be an alkyl (cyclic or acyclic), an alkenyl (cyclic or acyclic), or an alkynyl. An $R^2$ may be substituted, wherein 1 to 3 hydrogen atoms are replaced with a group selected from alkyl (cyclic or acyclic), aryl, alkenyl (cyclic or acyclic), and alkynyl. $R^2$ may be selected from $C_1$-$C_{20}$ alkyl; $C_1$-$C_{20}$ alkenyl; and $C_1$-$C_{20}$ alkynyl. More specifically, $R^2$ may independently be a $C_5$-$C_{17}$ alkyl, a $C_5$-$C_{17}$ alkenyl, or a $C_5$-$C_{17}$ alkynyl. Even more specifically, $R^2$ may independently be a $C_{17}$ alkyl, a $C_{15}$ alkyl, a $C_{11}$ alkyl, a $C_7$ alkyl, or a $C_5$ alkyl. According to Formula 3, n ranges from 0 to about 10, more typically from 1 to about 5. Py may independently be a pyrene or pyrene substituted with one or more halogen atoms (selected from chlorine, fluorine, bromine, or iodine), alkyl groups, alkenyl groups, alkynyl groups, and heteroalkyl groups. For example, Py is:

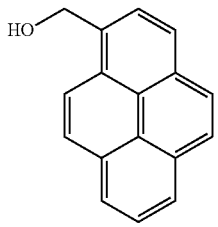

Formula 3

Other specific embodiments have Formula 4 or 5, illustrated below.

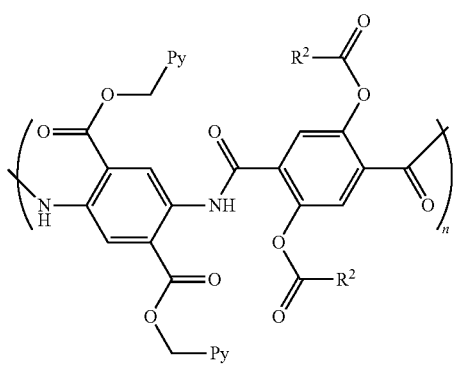

Formula 4

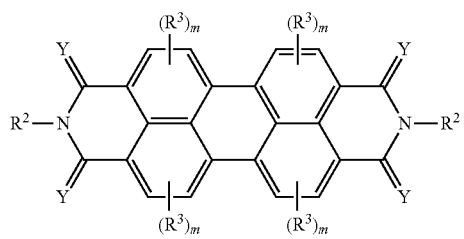

Formula 5

In Formula 5, Y may independently be an oxygen or a sulfur. In $NR^4$, $R^4$ may independently be a hydrogen, an aliphatic, an aryl, a heteroaryl, or a heteroaliphatic. $R^2$ is as described earlier above. $R^3$ may independently be a hydrogen, a halo, an aliphatic, an aryl, a heteroaryl, or a heteroaliphatic, wherein m ranges from 0 to about 2.

Other embodiments comprise compounds having Formula 6:

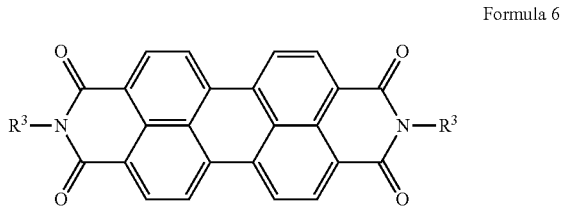

Formula 6

Example 7: Tuning Dye Quantum Efficiency by Varying Excitation by Wavelength Dye quantum efficiency (QE) is defined as the number of emitted photons divided by the number of absorbed photons. QE is a function of both the excitation wavelength and the emission wavelength. In an example, a 405-nm laser diode was used to provide the excitation wavelength. A film of the dye was placed in an integrating sphere connected to a calibrated fiber spectrometer. A coated LCP/dye sample was then placed in the center of the integrating sphere and a power spectrum of the sample was obtained. Based on the power spectrum, the QE of each dye was estimated. In general, QE depends on the peak absorption of the dye. A higher QE was obtained from dye 7A than from either dye 7B or 7C because the excitation wavelength of 405 nm is closest to the peak absorption of dye 7A:

Formula 7A and 7B

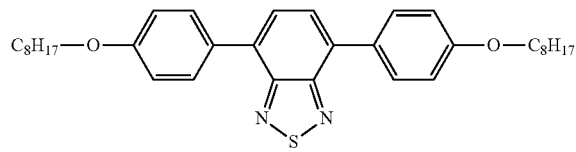

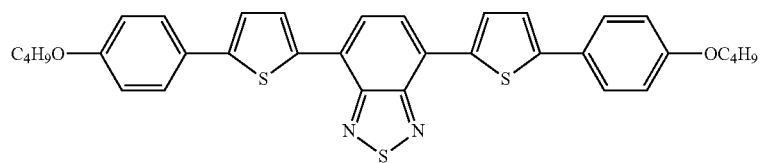

Formula 7C

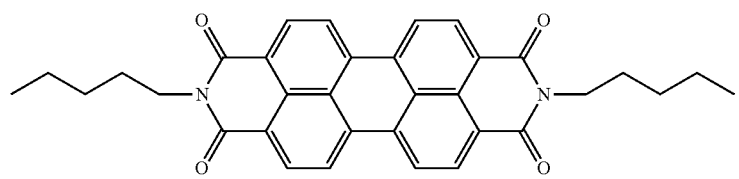

Example 8. Patterned Waveplates

A patterned waveplate was fabricated using an LPP material ("ROP-103") and an LPC material ("ROF-5102") supplied by Rolic Technologies (Switzerland). An exposure system was developed to align and cure the ROP-102 and ROF-5102 layers, respectively. A Hamamatsu LC5 UV light source was collimated and filtered (passband of 280 nm to 350 nm) and then linearly polarized using a dichroic UV polarizer. The sample having the LPP layer to be oriented was placed on a rotational stage for exposure with an arbitrary direction of UV polarization. The UV-beam intensity at the stage was 12 µW/cm$^2$. Exposure times varied based on the number of alignment directions and substrate reflectivity. The coating and alignment process for ROP-103 was (1) spin coat at 2500 RPM for 60 seconds, (2) bake for 5 minutes at 175° C. to evaporate residual solvent, and (3) perform alignment exposure(s). The resulting film thicknesses were approximately 50 nm and of negligible retardance. Patterned alignment was achieved by adding a contact mask during a first exposure. The mask was then removed, followed by rotating the stage (and substrate) 90°, and performing a second exposure.

The LCP "ROF-5102" was applied at a thickness associated with operation as a half-wave plate at a selected wavelength. The thickness and retardance exhibited by ROF-5102 were functions of spin rate. Application of the LCP material to LPP-coated substrates was by spin-coating at 850 rpm for 2 minutes, followed by annealing at 52° C. in an oven for 3 minutes, followed by exposure to 50 mW broadband UV light for five minutes in a nitrogen atmosphere to cure the material. For operation as a half-wave plate at 532 nm, the thickness of the ROF-5102 film is about 2.2 µm, and retardance is controlled to within ±5% across 1.5-inch diameter substrates.

The patterned waveplate can be used as, for example, a patterned retarder.

Example 9. Mixed Chrome and LC Features

Figure 5:
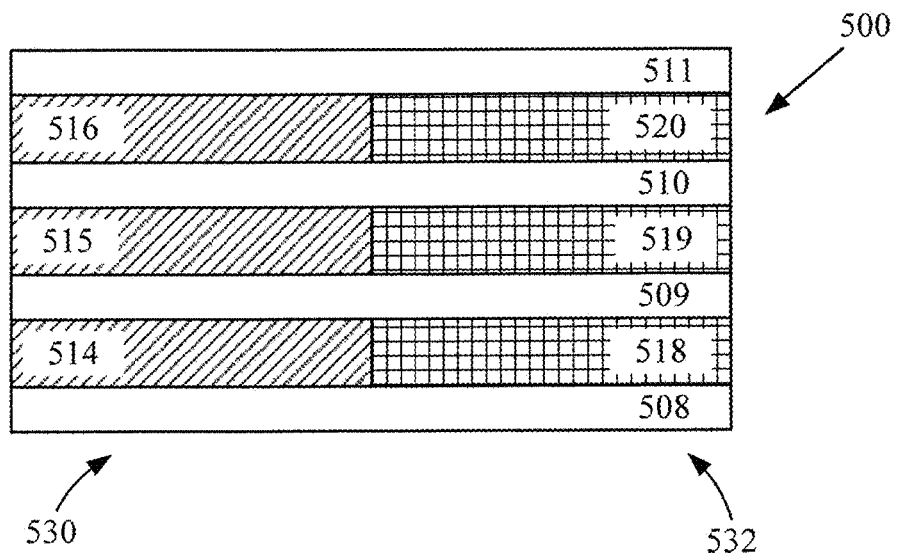
FIG. 5 illustrates a mask defining mixed chrome and LPP/LCP pattern features.
Figure 6:
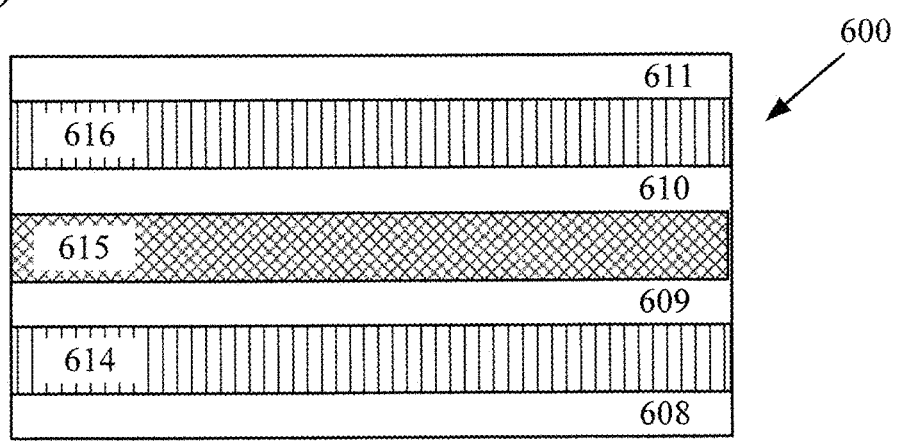
FIG. 6 illustrates an alternative mask defining mixed chrome and LPP/LCP pattern features.

Substrates can also include combinations of chrome and LC features. With reference to FIG. 5, a mask 500 is formed on a substrate having a patterned chrome layer formed as chrome regions 508-511, a patterned LPP layer (alignment layer), and an LCP layer defining pattern regions 514-516 and 518-519 in a first pattern area 530 and a second pattern area 532, respectively. Other combinations of chrome and LPP/LCP pattern features can be used. With reference to FIG. 6, a mask 600 includes a substrate having a patterned chrome layer defining alternative pattern lines 608-611, a patterned LPP layer (alignment layer), and an LCP layer having alternatingly oriented pattern lines 614-616.

Example 10. Patterned LCP Polarizers

Patterned polarizers can be fabricated that comprise at least one group of LPP/LCP layers. In this example, the LPP material was LIA-01 from Dainippon Ink and Chemical. The LCP material was "RMS03-001C" from Merck, delivered as a 30% (w/w) solution of propylene glycol monomethyl ether acetate (PGMEA). As noted above, the LCP is a reactive mesogen that cures under UV light. Various dichroic dyes were purchased from Hayashibara Biochemical Laboratories, Inc., and round substrates made of soda-lime glass were used. An optical adhesive (Norland Optical Adhesive 60) was used as a barrier layer. UV exposures were made using a Hamamatsu Deuterium Fiber Optic Lamp, adjusted to provide an intensity of 20 mW/cm$^2$ for making exposures.

In a typical example, a 1.5"-diameter soda-lime wafer was spin-coated with LPP at 2000 rpm and dried at 95° C. for two minutes. The selected LPP material was rewritable. Hence, the entire substrate was first exposed with LPUV for 30 seconds at 0° using the deuterium fiber-optic lamp. A dark-field Air Force Resolution chrome mask was then placed in contact with the substrate. Then, the substrate/mask assembly was rotated 90° and a second exposure was performed for 180 seconds, resulting in formation of a second pattern orthogonal to the first pattern. A mixture of LCP and a selected dichroic dye was spin-coated on the patterned LPP substrate.

More uniform polarizing coatings can be produced using dichroic dyes that are readily miscible in the liquid crystal. A 10 mg/ml stock solution of a selected dichroic dye in CHCl$_3$ was prepared and mixed with an equal volume of LCP-RMS03-001C solution in PGMEA. The solution of dye and LCP in a CHCl$_3$/PGMEA mixture was then spin-coated on the aligned patterned substrate at 1000 rpm and dried for 2 minutes at 55° C. to remove residual solvent. As the solvent evaporated, the LC/dye mixture aligned to the LPP pattern in a nematic phase. The substrate was then exposed to unpolarized UV light at 50 mW/cm$^2$ intensity for six minutes to cure the material, thereby producing a durable thin film.

For generating multilayer elements, such as circular polarizers, two successive layer groups (each having a respective alignment layer and LCP layer) are spin-coated onto the substrate. The first layer group forms a patterned retarder (obtained by spin-coating undoped LCP), and the second layer forms a uniform linear polarizer (obtained by spin-coating the mixture of dye and LCP). An optical adhesive was used as a barrier layer between the two LPP/LCP layer groups, applied by spin-coating at 2500 rpm and UV curing for 5 minutes at an intensity of 50 mW/cm$^2$.

Representative dyes are listed in the table below, but alternative dyes can be used.

| Dye No. | Visible Color | $\lambda_{max}$ in $CHCl_3$ | $\lambda_{max}$ 10 mg/mL Polarizer |
|---|---|---|---|
| G-207 | Yellow | 387 nm | 386 nm |
| G-241 | Purple | 553 nm | 599 nm |
| G-472 | Blue | 619 nm | 652 nm |

In other examples, multiple dyes are mixed together produce a "gray" polarizer. For use, each dye was diluted with $CHCl_3$ to 2 µg/mL. The thus diluted dyes were then mixed together in various ratios. Preferred mixtures suitable for a color-neutral polarizer were estimated and measured in a spectrometer. Optimal ratios were 10:10:2 Blue:yellow:blue or 5:5:1 (blue:yellow:red).

Polarized-Light Emitters

Figure 7:
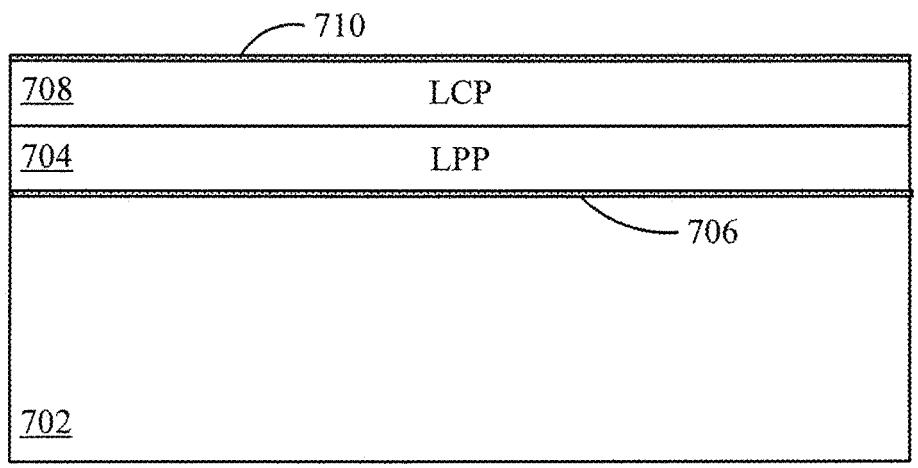
FIG. 7 illustrates features of a light emitter based on a doped LCP layer aligned with an LPP layer.

FIG. 7 illustrates features of an embodiment of a polarized-light emitter based on an aligned LCP layer. In FIG. 7 a substrate 702 is provided with a first conductive layer 706 such an opaque or transparent layer of a metal or metal oxide (e.g., indium tin oxide, abbreviated "ITO"). A patterned or otherwise oriented LPP layer 704 (alignment layer) is situated on the conductive layer 706. A LCP layer 708 is situated on the alignment layer 704, and a second conductive layer 710 is provided on the LCP layer 710. The LCP layer 708 includes a suitable guest material such as an organic semiconductor. Application of an electrical voltage across the conductive layers 706, 710 injects charge carriers (as well as their respective recombination products) into the intervening layers, resulting in emission of polarized light. The polarization state of the emission is based on the particular alignment in the LCP layer 708.

The LCP/LPP layers can be patterned as desired to produce patterned emission. Patterning can be by, for example, microlithography, resulting in formation of a desired array of individual light emitters, wherein each emitter includes respective first and second electrodes that are individually controlled to activate the pattern elements individually. For example, row and column conductors can be provided, based on the conductive layers (e.g., the layers 706, 710), to activate corresponding light-emitter elements defined by individual intervening LCP and LPP layers. In some examples, first and second LCP layers with n-type and p-type organic semiconductor guests, respectively, are configured to provide p-n junctions, but single layers or other organic LED configurations can alternatively be used.

Additional Devices and Applications

Optical sensors such as charge-coupled devices (CCD) and complementary metal-oxide semiconductor (CMOS) devices can be provided with patterned or unpatterned polarizers and/or retarders as described above. Optical filters such as conventional thin-film or absorptive filters can include one or more groups of LCP/LPP layers that serve as polarizers (e.g., linear, circular, or elliptical polarizers), or retarders of arbitrary retardation such as quarter-wave or half-wave retardation. The LCP/LPP layers can be patterned or unpatterned, and structures having more than one layer group can include different patterns on some layer group(s) compared to other layer group(s). Representative applications in this regard include three-dimensional displays, interferometry, optical storage, polarimeters, and polarization-sensitive cameras.

In some applications, a so-called "pixelated phase mask," comprising a patterned polarizer or retarder based on one or more LPP/LCP layer groups can be configured for use in spatial phase multiplexing in interferometry. For example, a patterned retarder made up of multiple layer groups or of one layer group can comprise retarder pattern elements of the same or varying retardation and with the same or common alignment. A patterned polarizer can be provided having a regular or other predetermined arrangement of polarizer elements so that orthogonal test and reference wavefronts incident to the patterned polarizer produce an interference pattern this is detected by an array detector. Typically, the pitch of a patterned polarizer/retarder is the same as or an integer multiple of the pixel pitch of the detector array. Uses of such pixelated phase masks are described in Brock et al., U.S. Pat. No. 7,230,717, which is incorporated herein by reference. In some examples, a pixelated phase mask includes quarter-wave retarders and polarizing elements, or other combinations of polarizing elements and retarder elements, typically selected to produce interference between incident orthogonally polarized test and reference wavefronts.

Broadband Devices, General

This disclosure also includes incorporating multi-layer structures as described above (e.g., devices having multiple PPN/LCP layer groups) into devices providing broadband (wide wavelength range) and/or wide-angle performance for generating and sampling polarization states and for use as polarized-light emitters. Devices currently known are generally capable of operation at a single wavelength and/or narrow angle of light. By employing multiple layer groups in a device as described below, it is possible to optimize devices for operation at multiple wavelengths and/or angles. Each such layer group (e.g., retarder and polarizer) comprises at least a respective alignment layer and a respective LCP layer.

In various embodiments described below, multiple groups of respective alignment layers and LCP layers are used to provide broadband retarders, polarizers, and light emitters exhibiting high spatial resolution while producing desired selected retardance(s) and polarization(s). Also, strategic use of barrier layers ensures that the various optical layers (alignment layers and corresponding LCP layers) are protected. Barrier layers can also provide desirable planarity and lack of surface topography of the layers, which serve to reduce light scattering and provide increased extinction ratios. Barrier layers also prolong the operating lifetime of the devices and can serves as antireflection coatings.

In the LCP layers of some embodiments, twisted nematic LCPs are used. The LCP layers in other embodiments comprise nematic liquid crystal molecules that lack twisted structures. In any event, the structures are useful for specific broadband and/or large-angle applications.

Multi-Pixelated Broadband Imaging Polarimeters

A pixelated polarimeter produces multiple pixelated intensity measurements through different polarization filters. A division of focal-plane (DoFP) polarimeter utilizes a polarization focal-plane array (FPA) that is analogous to a Bayer color-filter FPA in that neighboring pixels on an image sensor have different respective filters. Usually the FPA pattern consists of an array of 0°, 45°, 90°, and 135° linear polarizers; however, such a configuration is only capable of measuring the linear components of polarization, i.e., not all the components of the Stokes vector. To obtain a complete polarization measurement, measurements of elliptical and circular polarization components are also required.

Figure 11:
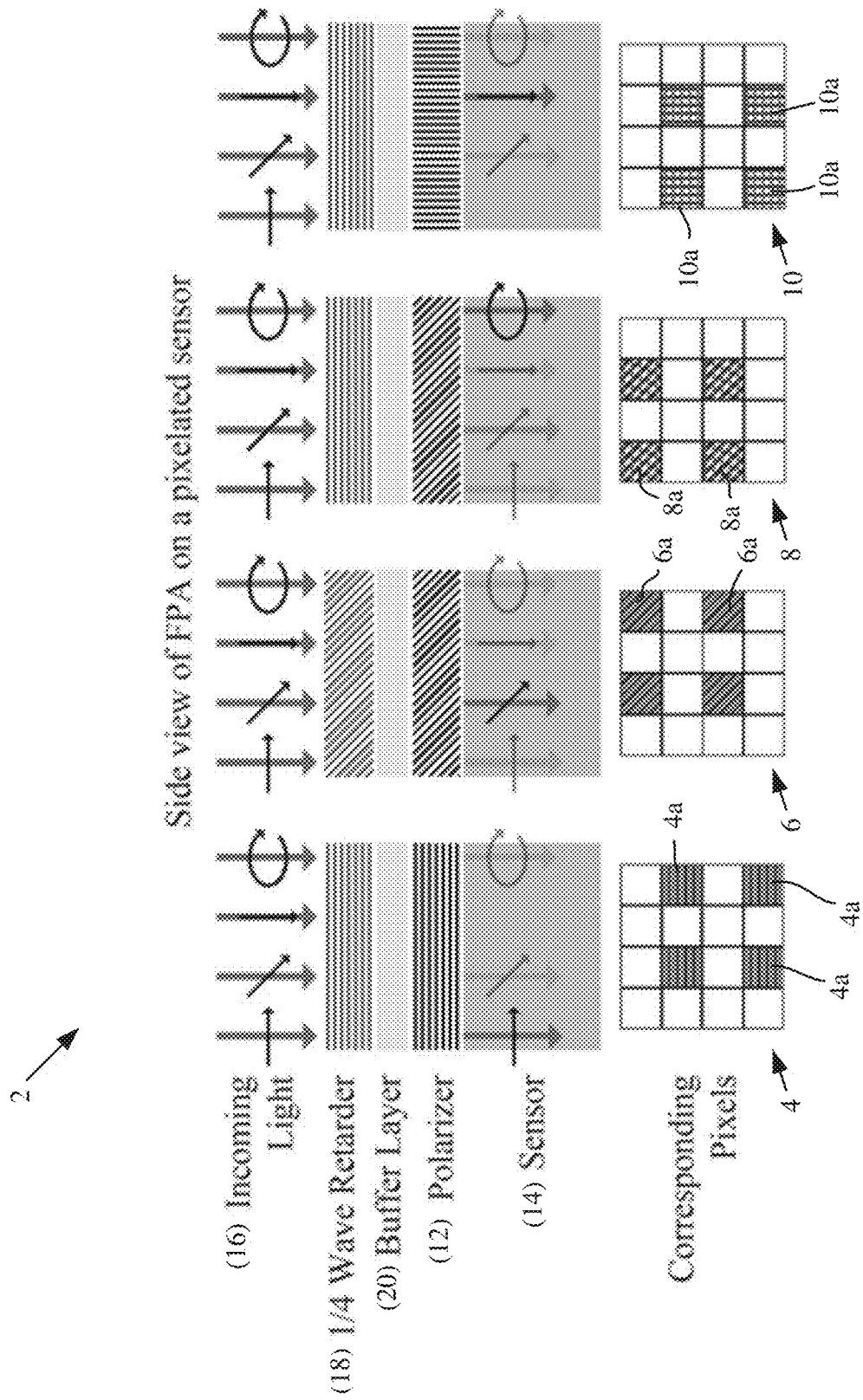
FIG. 11 is a schematic diagram of a focal-plane array (FPA) of a conventional full-Stokes division-of-focal-plane (DoFP) polarimeter operable only as a narrow-band or narrow-angle device. Four pixels are shown in elevational view.

A full-Stokes DoFP polarimeter having a configuration described generally in the '910 application is shown schematically in FIG. 11, in which the FPA is shown in a side-elevational view. The depicted portion of the FPA constitutes a "macro-pixel," comprising sixteen corresponding pixels in four groups 4, 6, 8, 10. I.e., each group 4, 6, 8, 10 comprises four respective pixels 4a, 6a, 8a, 10a. The polarimeter includes one λ/4 retarder layer 18 and one polarizer layer 12 disposed on a sensor 14 serving as a substrate. Although not detailed in the figure, the polarizer layer 12 and the retarder layer 18 each comprise a respective alignment layer and a respective LCP layer. A "buffer layer" (barrier layer) is disposed on the polarizer layer 12. Although not shown, a second barrier layer can be disposed on the retarder layer 18. The barrier layer(s) protect the retarder layer and polarizer layer and can also serve as a respective planarization layer.

Incident light 16 having a particular polarization profile passes through the retarder 18 and polarizer 14 to the sensor 14. Note that the polarization profile of the incident light 16 is the same for all pixels 4, 6, 8, 10, but the polarization states of respective light reaching corresponding pixels of the sensor 14 are different for each pixel. I.e., the sensor 14 receives respective polarized light from the polarizer 12 such that each group 4, 6, 8, 10 of sensor pixels receives light of a respective polarization state, as determined by the retarder 18 and polarizer 12 (shown are 0°, 45°, RCP, and 90°). Whereas each orientation combination of retarder and polarizer transmits a different polarization state to the respective pixel below, retardance produced by the single retarder 18 is a strong function of the wavelength of the light 16 passing through it. Hence, a polarimeter configured as the DoFP shown in FIG. 11 can only sample polarization states of incident light at a single specific wavelength within a narrow wavelength band and at small angles. This conventional polarimeter has a limited number of applications and usually requires long exposure times when used for imaging or sensing of incoming light.

Various embodiments described hereinbelow overcome the narrow-wavelength characteristic of the device shown in FIG. 11. Certain embodiments are DoFP polarimeters configured to obtain data on polarization states of incoming light at multiple wavelengths. To such end, the embodiments comprise multiple (at least two) retarder layers that collectively produce retardance over a defined range of wavelengths of incoming light, and thus are called "broadband" devices. The specific range of wavelengths depends upon material, thickness, and polarizing function of the retarder layers. The polarizing layer and each retarder layer comprises a respective alignment layer and a respective LCP layer aligned with the alignment layer. The materials of the alignment layers need not be the same, and the materials of the LCP layers need not be the same (but, they can be). By way of example, one or more retarder layers can comprise a respective combination of two different materials to minimize variation of the retardation with wavelength.

Figure 12:
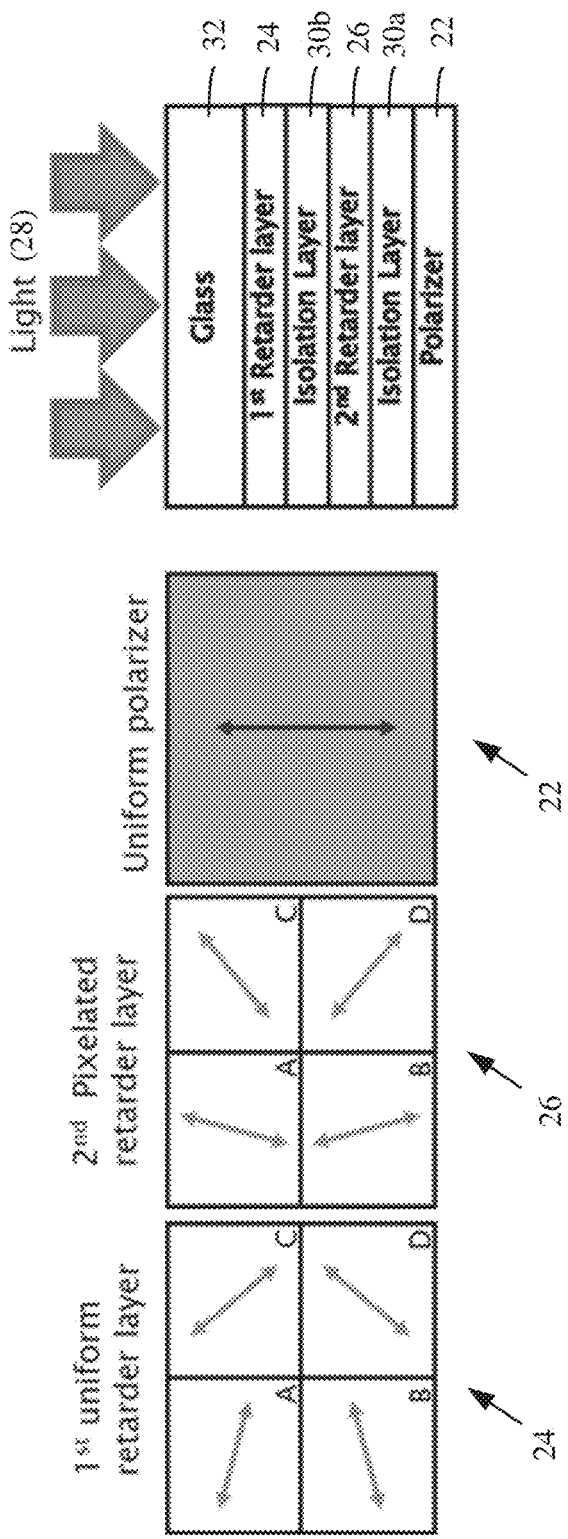
FIG. 12 is a schematic diagram of a FPA as used in a first representative embodiment of a DoFP polarimeter, comprising a linear-polarizer layer and two retarder layers. The retarder layers are made of different materials and have different thicknesses. On the right is an elevational view, and on the left are shown respective polarization directions at the first retarder layer group, at the second retarder layer group, and at the uniform polarizer layer group.

FIG. 12 is a schematic diagram of a first embodiment of a polarimeter that comprises a linear polarizer 22, a first retarder 24, and a second retarder 26. These components are formed as respective layers on a supportive substrate 32 (glass plate in this embodiment). The polarizer 22 and retarders 24, 26 each comprise a respective alignment layer and a respective LCP layer (not detailed). A respective isolation layer (barrier layer) 30a separates the polarizer 22 from the second retarder 26, and a respective barrier layer 30b separates the second retarder 26 from the first retarder 24. The retarders 24, 26 can have different respective thicknesses and can comprise different types of birefringent materials. (But, the thicknesses and/or materials can be the same.) Four pixels A, B, C, D are shown. In each pixel the respective fast-axis angles of the two retarders 24, 26 are perpendicular to each other (e.g., compare the pixel A of the first retarder with the pixel A of the second retarder). Thus, the pixels A, B, C, D perform as respective elliptical polarizers.

By way of example, with appropriate selection of material and thickness of each retarder 24, 26, the resultant retardance of each pixel A, B, C, D can be about 135°, within a 5% variation over a defined range of wavelengths of incoming light 28, by compensating the chromatic behavior. The resultant fast-axis angles of the pixels A, B, C, D in the second retarder 26 are, in this example, +15.1°, −15.1°, +51.7°, and −51.7°, respectively, relative to the vertical direction. (Compare with the fast-axis angles in the first retarder 24.) These four pixels A, B, C, D perform as respective broadband elliptical polarizers, and are optimized for inclusion in a polarimeter exhibiting a high signal-to-noise ratio. Note that respective isolation layers (barrier layers) 30a, 30b are situated between the layers 24, 26 and between the layers 22, 26. The substrate 32 in this embodiment serves as a light-incidence surface.

Figure 13:
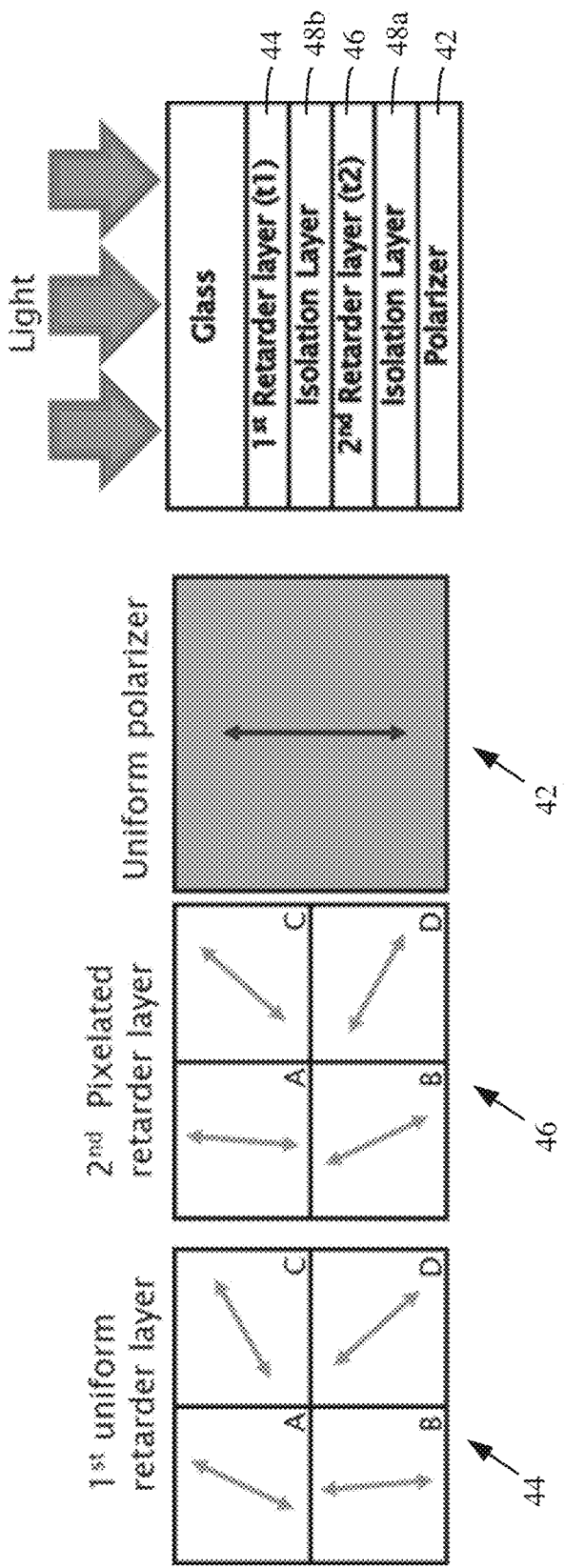
FIG. 13 is a schematic diagram of a FPA as used in a second representative embodiment of a DoFP polarimeter, comprising a linear-polarizer layer and two retarder layers made of similar materials but having different thicknesses. On the right is an elevational view, and on the left are shown respective polarization directions at the first retarder layer group, at the second retarder layer group, and at the uniform polarizer group.

FIG. 13 is a schematic diagram of the FPA of a second embodiment of a DoFP polarizer. This embodiment comprises a linear polarizer 42 and two retarders 44, 46. The polarizer 42 and retarders 44, 46 each comprise respective alignment layers and LCP layers (not detailed) aligned with them. The retarders 44, 46 in this embodiment have different thickness but are made of the same material. The fast-axis angles of the two retarders are not perpendicular to each other since birefringence compensation does not work directly when using similar materials. By way of example, the resultant fast-axis angles of pixels A, B, C, D are +15.1°, −15.1°, +51.7°, and −51.7°, respectively, relative to the vertical direction.

In a specific example, the fast-axis angles of the retarders 44, 46 rotate within ±30° oppositely. For example, if rotation is ±10°, the fast-axis angles of the pixels A, B, C, D of the first retarder 44 can be +25.1°, −5.1°, +61.7°, and −41.7°, respectively, (see left-hand panel of FIG. 13), while the fast-axis angles of these pixels of the second retarder 46 can be +5.1°, −25.1°, +41.7°, and −61.7°, respectively, as shown in FIG. 13. With appropriate selection of material thickness, the retardances produced by the pixels A, B, C, D can be 135°, with a 10% variation over a defined range of wavelengths. The pixels A, B, C, D can function as broadband elliptical polarizers of a polarizer exhibiting a high signal-to-noise ratio.

Note that the embodiments of FIGS. 12 and 13 can be pixelated or uniform (not patterned). For example, in a device such as shown in FIG. 13, the first retarder 44 is uniform, the second retarder 46 is pixelated, and the polarizer 42 is uniform. A pixelated configuration is typically according to a particular pattern, which can be achieved by microlithography, for example.

Multipixelated Broadband Polarized Light Sources

A broadband micropolarizer based, as described above, on multiple layer groups (each comprising a respective alignment layer and a respective LCP layer) can be configured as a patterned source of broadband light (e.g., white light) of a predetermined polarization state(s). The light source can be configured to produce a pixelated multi-polarized broadband light, with particular applications in displays. In many embodiments the light source can be patterned as an array of non-polarized light sources, with corresponding arrays of optics as required (including at least one polarization filter).

Figure 14:
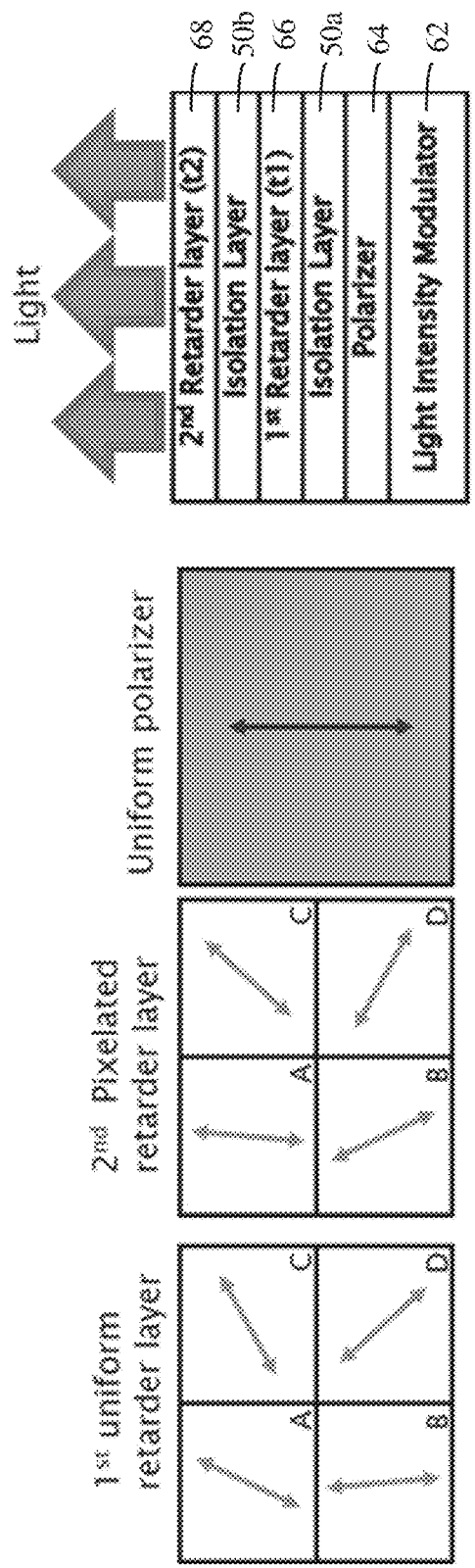
FIG. 14 is a schematic diagram of a FPA as used in a representative embodiment of a multipixelated polarized white light source, comprising a linear-polarizer layer and two retarder layers of different thicknesses but made of similar materials. On the right is an elevational view, and on the left are shown respective polarization directions at the first retarder layer, at the second retarder layer, and at the uniform polarizer.

FIG. 14 is a schematic diagram of an exemplary embodiment for producing multi-polarized broadband light. Light emitted from a pixelated light-intensity modulator 62 passes sequentially through a uniform vertical polarizer 64, a first retarder 66, and a second retarder 68. Similar to the second embodiment, the retarders 66, 68 each comprise a respective alignment layer and a respective LCP layer aligned with the alignment layer. In this embodiment the materials of the retarders 66, 68 are the same, but the retarders have different thickness. The respective polarization properties of the retarders 66, 68 can be established by controlling the materials, the thickness, the dimensions, and other respective properties of the individual retarders. In this example, the corresponding fast-axis angles of the two retarders 66, 68 are rotatable within ±30° oppositely. The respective fast-axis angles of the pixels A, B, C, D of the first retarder 66 can be +25.1°, −5.1°, +61.7°, and −41.7°, respectively, while the respective fast-axis angles of the second retarder 68 can be +5.1°, −25.1°, +41.7°, and −61.7°, respectively, relative to the vertical direction. The macro-pixels of the output light have four different elliptical polarization states. Continuing with the example above, the major-axis angles of the pixels A, B, C, D are +15.1°, −15.1°, +51.7°, and −51.7°, respectively, relative to the vertical direction. The ellipticities and orientations vary less than 10% from each other over a defined range of wavelengths. The depicted macro-pixel devices can function as pixelated multi-polarized sources of broadband light. Note also the respective isolation layers 50a, 50b between the first retarder layer 66 and the polarizer layer 64 and between the first and second retarder layers 66, 68.

Polarizer Categories

Categories of polarizers of various embodiments described herein are set forth in the following:

| Polarization | Absorption | Mechanism Interference | Reflectance | Birefringence |
|---|---|---|---|---|
| linear | dichroic crystal dichroic dye | thin-film stacks | wire grid Brewster's type | birefringent crystal |
| circular | opt.-active molecules | cholesteric liq. crystal | helical wire structure | opt.-active crystal |

According to the above, patterned circular polarizers, based on optical interference, can be fabricated using cholesteric LCPs. Patterned infrared (IR) polarizers, which operate by absorption, can be fabricated using IR dichroic dye as guest materials in LCP hosts. Also, real-time full-Stokes polarization imaging can be achieved using an array of different micropolarizers.

Multipixelated Broadband Retarders

Providing a particular broadband or wide-viewing-angle multilayer retarder includes determining the thickness and orientation of the multilayer, starting with the known material properties of the retarder layer at different wavelengths and angles. The material properties can be the refractive indices of both fast and slow axes, the absorption coefficient, the optical dispersion, and the maximum and minimum allowable thicknesses. The thickness and orientation of the multilayer are calculated to achieve the target retardance of the resultant retarder, e.g., by the following procedure:

(a) A sample is made, including co-aligned PPN and LCP materials applied to a desired substrate at known thicknesses. The phase retardance, $\phi(\lambda,\theta)$, of the sample is measured using a commercial polarimeter or ellipsometer. The measurement data for $\phi(\lambda,\theta)$ is fitted with a fitting function for subsequent extrapolation and interpolation.

(b) The Jones matrix or Mueller matrix formalism is used to calculate the theoretical retardance of the multilayer structure as a function of wavelength, angle, thickness, and orientation by using the measurement data obtained in (a).

(c) A merit function is defined as:

$$\text{Least square deviation} = \sum_{\substack{wavelength\ range,\\ angle\ range}} (\phi(\lambda,\theta) - \phi_0)^2$$

$$= \int_{\lambda_{min}}^{\lambda_{max}} \int_{\theta_{min}}^{\theta_{max}} d\lambda d\theta (\phi(\lambda,\theta) - \phi_0)^2$$

where the wavelength range spans from $\lambda_{min}$ to $\lambda_{max}$, and the angle range spans from $\theta_{min}$ to $\theta_{max}$. $\phi_0$ is the target retardance at a specific wavelength and a specific angle. An alternative version of the merit function can be defined to speed up the calculation and reduce calculation errors.

(d) The optimal thickness and angle of the multilayer structure is calculated using an optimization algorithm to minimize the merit function defined in (c).

Example 11: Broadband or Wide-Angle Retarder Comprising Two LCP Layers

Figure 15:
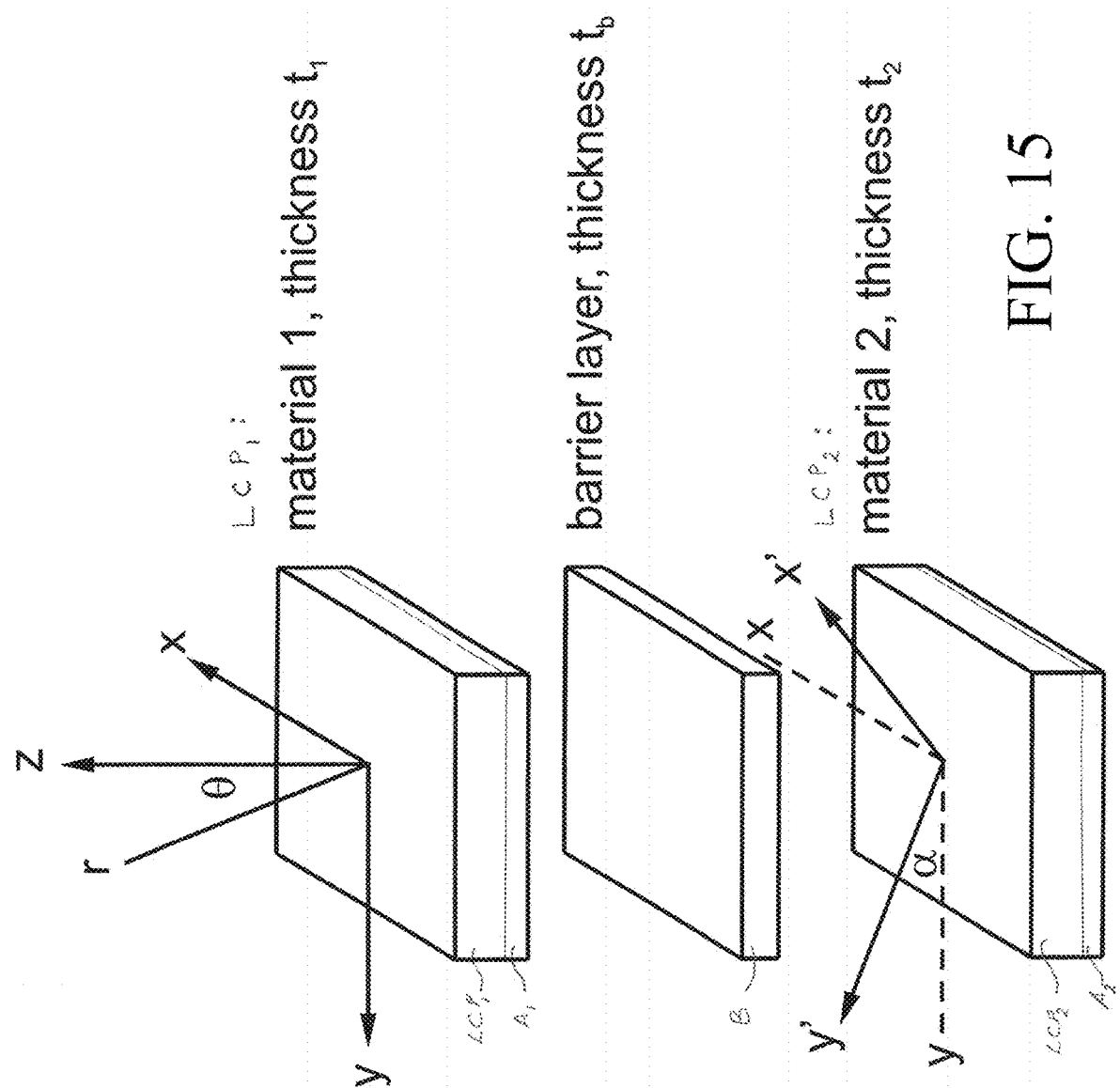
FIG. 15 is a perspective "exploded" view of a broadband or wide-angle retarder comprising two polarization layer groups each including a respective LCP layer formed at a respective thickness, separated by a barrier layer. Fast (x, y) and slow (x', y') polarization axes are shown. The thickness of the LCP layers are not necessarily equal.

FIG. 15 illustrates an exemplary broadband or wide-angle retarder comprising two LCP layers ($LCP_1$ and $LCP_2$) and one barrier layer B. Each LCP layer has a respective alignment layer ($A_1$, $A_2$) with which it is aligned. For simplicity, only three layers are illustrated, although more layers can be added above or below the three layers. In general, the number of LCP layers (each with its respective liquid-crystal orientation) is at least two, but the number actually used is kept to a minimum (at least two) because additional layers can increase manufacturing defects and costs without providing significant compensating benefit. The three layers are shown separated from each other for illustrative purposes, but actually are stacked. The axes x, y and x', y' are the fast and slow axes, respectively, of the LCP polarizer. The z axis is perpendicular to the plane defined by the axes x and y.

In this embodiment the LCP layer 1 ($LCP_1$) is made of polarizing material 1 having thickness $t_1$. The barrier layer is $SiO_2$, having a thickness of 50 nm, for example. The LCP layer 2 ($LCP_2$) is made of a polarizing material 2 having thickness $t_2$. Material 1 can be the same as material 2, although it is usually desired that they be compositionally different and have different optical properties. The axis of material 1 is oriented at an angle $\alpha$ from the axis of material 2. (This axis can be the fast axis or slow axis of the respective birefringent material.) The vector r, which makes an angle $\theta$ with respect to the z axis, represents an incoming or outgoing ray of light. The operating-wavelength range spans from $\lambda_{min}$ to $\lambda_{max}$, and the operating-angle range spans from $\theta_{min}$ to $\theta_{max}$. $\phi_0$ is the target retardance at $\lambda_0 = (\lambda_{max} + \lambda_{min})/2$ or $\theta_0 = (\theta_{max} + \theta_{min})/2$. The two LCPs of known thickness are characterized using a polarimeter (Axometrics Inc., Huntsville, Ala.) for the respective wavelength and angle range. The resulting experimental data set, such as the retardance or coefficients of the Mueller matrix, is utilized as the input of a calculation of a merit function. The merit function is defined to minimize the deviation of the retardance for the wavelength and angle range. The optimization toolbox in MATLAB (Mathworks Inc., Natick Mass.) can be used to calculate the thicknesses $t_1$ and $t_2$ and the angle $\alpha$ for the optimal broadband or wide-view-angle retarder.

Example 12: Broadband Retarder Comprising One LCP Layer

For certain applications, especially where the operating wavelength range is relatively narrow (e.g., 500 nm±10 nm), it is possible to create a retarder utilizing only a single aligned LCP layer. In such an instance the LCP can be made as a mixture of two or more LCPs having different respective refractive indexes. The different polymers must be chemically compatible and soluble with each other and must align independently in a fixed direction. Alignment is achieved when the direction of the aligned LCP is uniform within the retarder area. By choosing polymers of different dispersions, it is possible to create, for example, a flat retardance over the operating wavelength range. Here, "dispersion" is defined as the variation of refractive index as a function of wavelength.

Example 13: Broadband Polarizer Comprising Dyes of Different Colors

A broadband circular or elliptical polarizer can comprise a combination of a broadband retarder, as discussed in Example 11, and a broadband linear polarizer, as discussed in Example 10. The wavelength range of the broadband linear polarizer can extend, for example, over any of the following ranges: from 400-700 nm, 700-1200 nm, or 400 nm-1000 nm, depending on the design. A broadband linear polarizer can comprise a mixture of dichroic dyes in an aligned LCP. The dichroic dyes are selected based on having good solubility and exhibiting good alignment in the liquid-crystal matrix. Certain commercially available dyes are optimized for laser applications and tend to be ionic or highly polar. The dyes tend to be soluble only in polar solvents. A polarizer having a high extinction ratio requires a high concentration of dye in the solvent, and this is often limited by the dye's solubility. This solubility depends on both the dyes and the solvents. Candidate solvents include, but are not limited to, chloroform, acetone, methanol, THF, PGMEA, toluene, NMP, cyclohexane, and cyclopentanone.

Besides the solvent selected for the dye(s), the solvent for the LCP is selected for its ability to form well-aligned liquid-crystal films. In general, the equilibrium vapor pressure of the solvent desirably is low so as to obtain good alignment of the liquid crystal with its respective alignment layer. The boiling temperature of the solvent desirably is lower than the temperature of the liquid-crystal phase-transition point (e.g., ~75° C. for RMM141C made by EMD Millipore Corp., Philadelphia, Pa.). A mixture of two or more solvents can be effective for dissolving and aligning dye molecules in the liquid crystal matrix. Among suitable solvents, PGMEA, toluene, NMP, cyclohexane, and cyclopentanone have relatively high boiling temperatures (>75° C.), making them less useful for aligning the dye and liquid crystal. On the other hand, acetone is a good solvent for DLS-910B and DLS-912C (dyes made by CrystaLyn, Inc., Binghamton N.Y.) and has a fairly high equilibrium vapor pressure. Based on experience with the different solvents, a mixture of chloroform and acetone can be used to slow down evaporation to improve the alignment of the LCP. By way of example, a 2:1 mixture of chloroform:acetone can provide good alignment of dye molecules in the liquid crystal matrix. At room temperature, the vapor pressure desirably is less than 150 mmHg to obtain good alignments. For example, the vapor pressure of chloroform is about 110 mmHg Vapor pressures of acetone and toluene are about 200 mmHg and 30 mmHg, respectively. The vapor pressure of a mixture of these solvents is approximately 150 mmHg.

Example 14: Broadband Polarizer Comprising a Wire-Grid Linear Polarizer

A broadband circular or elliptical polarizer can be formed by using a combination of a broadband retarder, as discussed in Example 11, and a wire-grid linear polarizer. A wire-grid linear polarizer comprises an array of metallic wire (e.g., Al or Ag). The wire-grid polarizer transmits light having the electric field vector perpendicular to the wire and reflects light with the electric field vector being parallel to the wire. The polarizer can be placed above or below a broadband retarder by using interference lithography, imprint lithography, or EUV lithography. The thickness of individual wires typically ranges from 20 nm to 250 nm, and the separation between adjacent wires typically ranges from 40 nm to 500 nm. A transparent, planarized barrier layer can be used to separate the wire grid polarizer from the broadband retarder. An antireflection layer can be added with the wire-grid polarizer to increase transmission of light.

Example 15: Optimized Elliptical Polarizer in a Broadband Polarimeter

Measurements of the four Stokes parameters, representing the polarization state of light, require at least four measurements using four different polarization filters. These measurements can be performed using a DoFP polarimeter, where each pixel measures a different elliptical polarization state.

Figure 16:
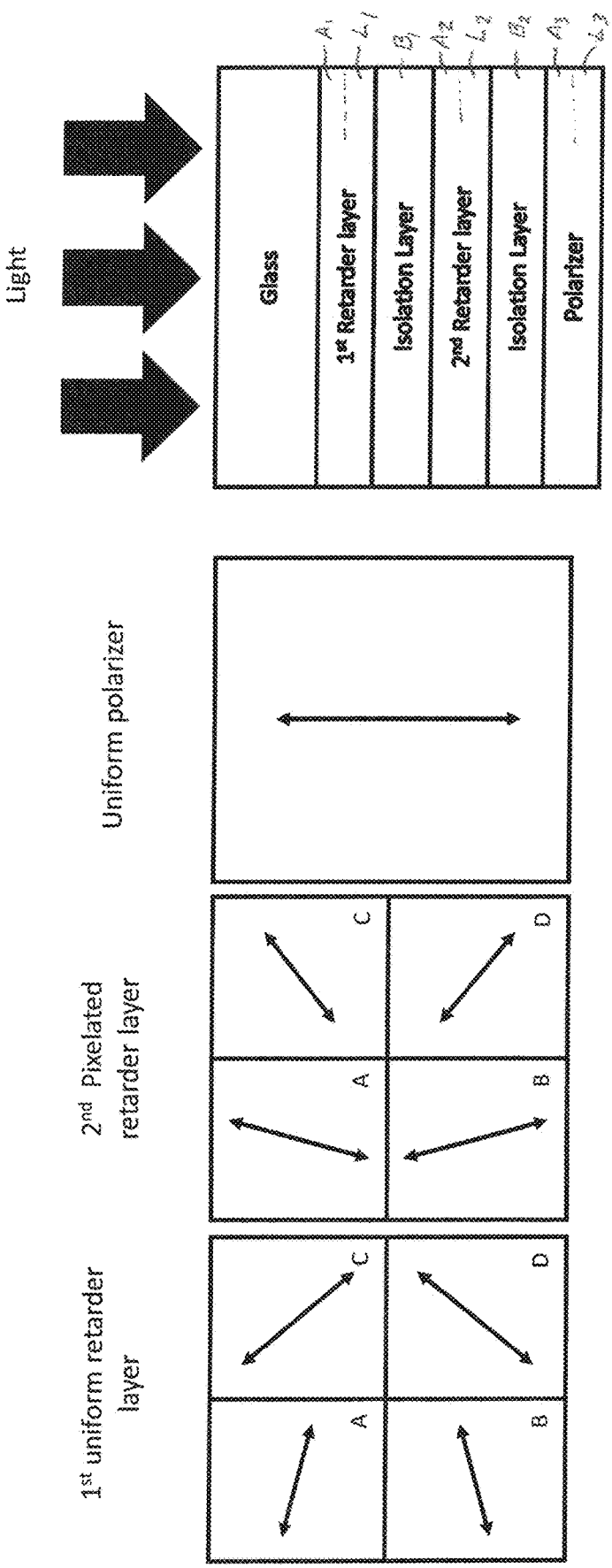
FIG. 16 is a schematic diagram of an array of four broadband elliptical polarizers (A, B, C, D) of a thin-film device comprising a linear polarizer and two retarder layers made of different birefringent materials.

A device according to this example is depicted in FIG. 16. The device comprises a glass substrate, a first patterned retarder layer (comprising a first alignment layer $A_1$ and first LCP layer $L_1$), a first isolation (barrier) layer $B_1$, a second patterned retarder layer (comprising a second alignment layer $A_2$ and second LCP layer $L_2$), a second isolation (barrier) layer $B_2$, and a uniform polarizer layer (comprising a third alignment layer $A_3$ and third LCP layer $L_3$. The birefringent material in the first retarder is different from the birefringent material in the second retarder. For the uniform vertical polarizer and patterned retarder, a 135° retarder can be used, having fast-axis angles of ±15.1° and ±51.7°. In this example, each retarder is pixelated. With the retarders being pixelated, this example provides an array of elliptical polarizers A, B, C, D, each comprising the uniform vertical polarizer and respective regions of the patterned retarders. The device is shown in FIG. 16, having a configuration as described in Examples 13 and 14. This broadband elliptical polarizer array is situated on a glass wafer or other transmissive substrate. The wafer is subsequently diced to form a quantity of individual filters, and the filters are aligned and mounted on a CCD or CMOS sensor. The dimensions of the filter desirably match corresponding dimensions of a pixel of the sensor. Alternatively, the broadband elliptical polarizer array can be fabricated directly on the sensor wafer, in which case alignment marks on the sensor wafer are useful for aligning to the elliptical polarizer layers.

Example 16: Wide-Angle Liquid-Crystal Display Including Broadband Polarizer

Figure 17:
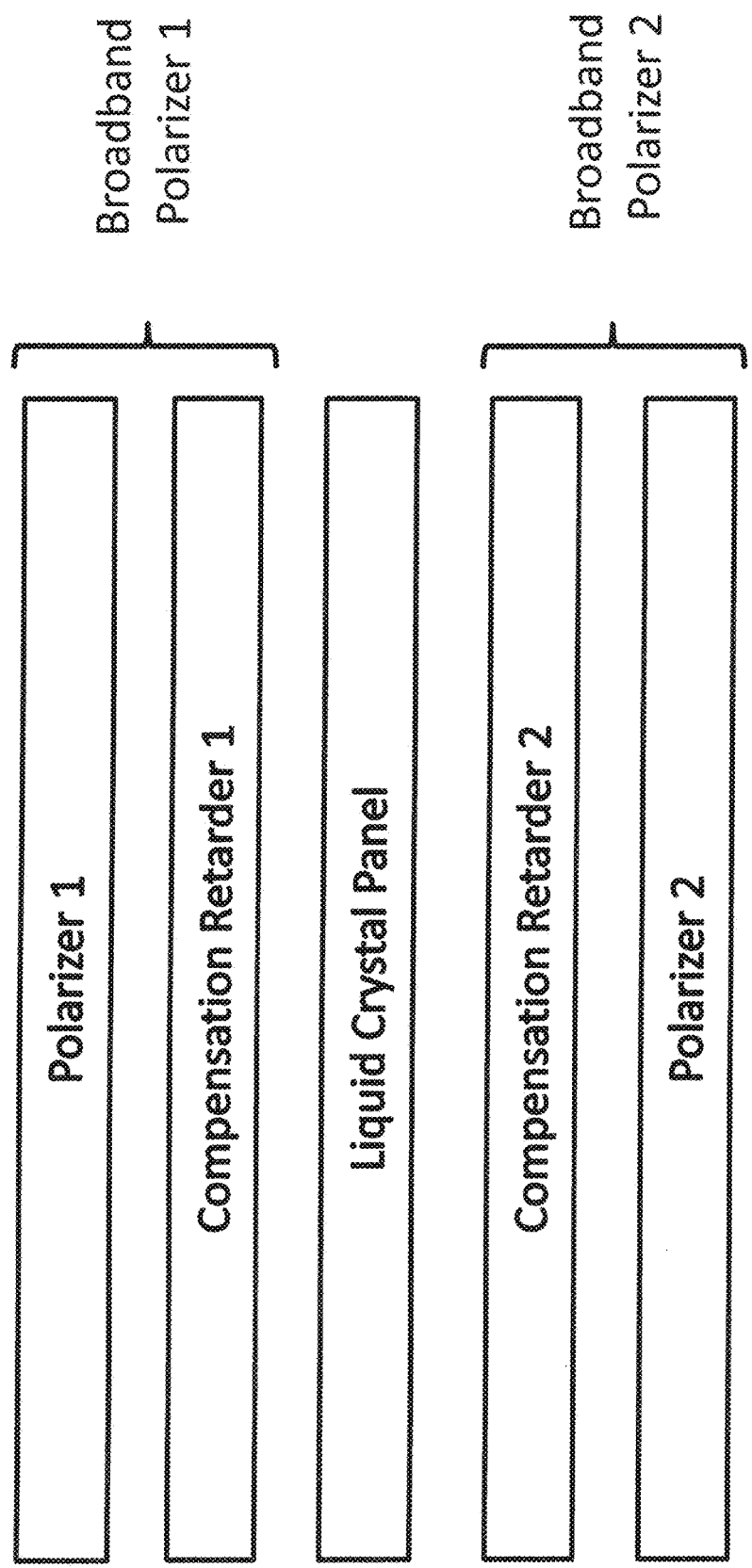
FIG. 17 is a schematic vertical depiction of an exemplary broadband polarizer comprising a liquid-crystal panel and two sets of broadband polarizers that operate at wide angles. The broadband polarizer operates at wide angles and comprises a compensation retarder and a polarizer. The combination of two compensation retarders and the liquid-crystal panel forms a tunable broadband and wide-angle retarder.

A liquid-crystal display according to this example comprises a piece of liquid-crystal display panel and two sets of broadband polarizers. The polarizers operate at wide angles as shown in FIG. 17. The broadband polarizer operable at wide angles comprises a compensation retarder and a polarizer. The combination of two compensation retarders, 1 and 2, and the liquid-crystal panel forms a tunable broadband and wide-angle retarder. The configuration is similar to Example 11 but has three liquid-crystal layers instead of two. The compensation retarder 1 comprises material 1 having a thickness denoted $t_1$. A commercial liquid-crystal panel has specific polarization properties depending on its driving voltage. Example driving voltages range from 3 to 15V. The compensation retarder 2 comprises material 2 having a thickness denoted $t_2$. Material 1 can be the same as material 2, or the materials are different. The axis of material 1 is oriented at an angle α from the axis of the liquid crystal panel, and the axis of the liquid-crystal panel is oriented at an angle β from the axis of material 2. The operating wavelength range spans from $\lambda_{min}$ to $\lambda_{max}$ and the operating angle range spans from $\theta_{min}$ to $\theta_{max}$. $\phi_0$ is the target retardance at $\lambda_0 = (\lambda_{max} + \lambda_{min})/2$ and $\theta_0 = (\theta_{max} + \theta_{min})/2$. Materials 1 and 2, and the liquid-crystal panel, are characterized using a polarimeter (Axometrics Inc., Huntsville, Ala.) for the wavelength and angle range. The experimental data set is utilized as the input of the theoretical calculation. A merit function is defined to minimize the deviation of the retardance for the wavelength and angle range. For twisted nematic LCD, the angle range is about 160-170 degrees. For multi-domain vertical alignment (MVA) or in-plane switching (IPS) panel, the standard view angle is about 178 degrees. The optimization toolbox in MATLAB (Mathworks Inc., Natick Mass.) can be used to calculate the thicknesses $t_1$ and $t_2$ and the angles α and β for the particular configuration of the broadband and wide-angle display.

Example 17: Organic LED Display Comprising Wide-Angle Broadband Polarizer

Figure 18:
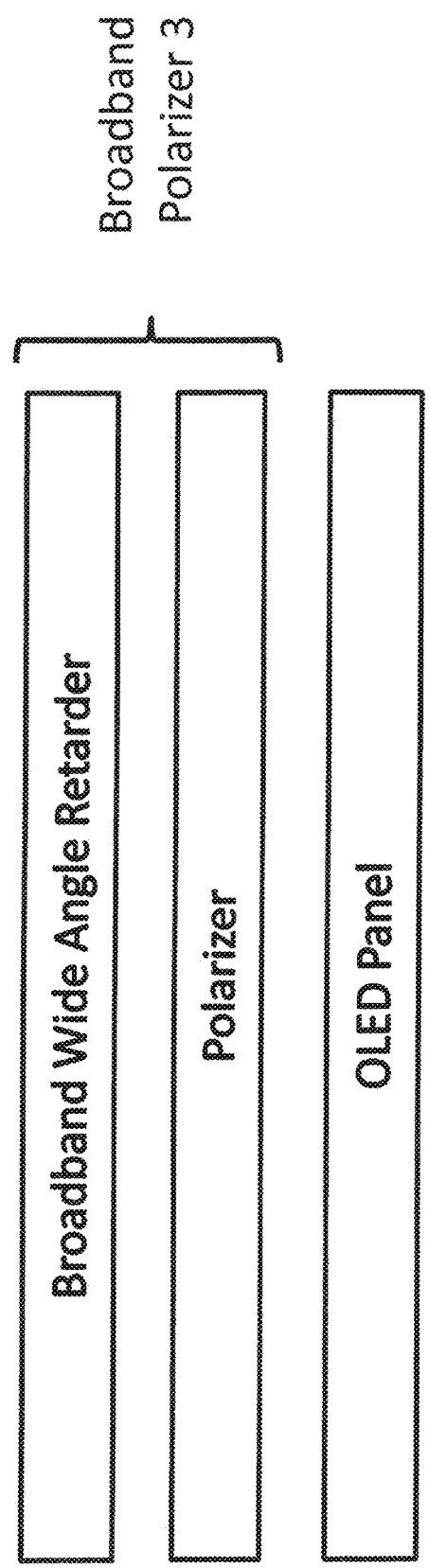
FIG. 18 is a schematic vertical depiction of an embodiment of a broadband wide-angle, 3-D organic LED (OLED) display comprising an OLED panel and a broadband polarizer. The broadband polarizer, which is a linear, circular, or elliptical polarizer, comprises a combination of a broadband wide-angle retarder and a linear polarizer.

A stereoscopic, spatially multiplexed 3-D display requires a patterned polarization panel. The user can see images of different polarizations by wearing polarization-selective goggles, for example. An example patterned polarization panel comprises an OLED display with a broadband polarizer that operates at wide angles. FIG. 18 illustrates a broadband wide-angle 3-D OLED display comprising an OLED panel and a broadband polarizer. The broadband polarizer can be a linear, circular, or elliptical polarizer and can include a broadband wide-angle retarder and a linear polarizer, as discussed in Examples 13 and 14. The broadband polarizer can cover the red, green, and blue spectra. Using this configuration, the output polarization of the 3-D display can be optimized over the wavelength range from $\lambda_{min}$ to $\lambda_{max}$ and the operating angle range from $\theta_{min}$ to $\theta_{max}$, as discussed in Example 11.

The various embodiments described above are not limited to sensing and/or emitting light only in the visible-light portion of the electromagnetic spectrum. The embodiments are readily applied to other wavelength ranges in portions such as near, short, mid, and far infrared.

In view of the many possible embodiments to which the principles of the disclosed technology may be applied, it should be recognized that the illustrated embodiments are examples and should not be taken as limiting in scope. We therefore claim all that comes within the scope and spirit of the appended claims.

We claim:

1. An optical device, comprising:
a substrate;
a color filter array; and
first and second retarder layer groups forming a layer stack on the substrate, the first retarder layer group comprising a first alignment layer and a first liquid-crystal-polymer (LCP) layer, the first LCP layer including molecules aligned with molecules in the first alignment layer;
the second retarder layer group comprising a second alignment layer and a second LCP layer, the second LCP layer including molecules aligned with molecules of the second alignment layer;
at least a first barrier layer situated in the stack between the first and second retarder layer groups; and
a polarization layer group in the stack, the polarization layer group comprising a respective alignment layer and a respective LCP layer, the respective LCP layer including molecules aligned with molecules of the respective alignment layer, wherein the optical device is pixelated, wherein each pixel is responsive to different respective polarization states of incident light at different colors, wherein the polarization states are linear, elliptical, and/or circular polarization states.

2. The optical device of claim 1, wherein the polarization layer group and at least one of the first and second retarder layer groups are pixelated.

3. The optical device of claim 1, wherein at least one of the first and second retarder layer groups is uniform.

4. The optical device of claim 1, wherein at least one of the first and second retarder layer groups is pixelated.

5. The optical device of claim 1, further comprising a second barrier layer, wherein:
the first barrier layer is disposed in the stack on the first retarder layer group; and
the second barrier layer is disposed in the stack on the second retarder layer group.

6. The optical device of claim 1, wherein:
the first retarder layer group is patterned;
the second retarder layer group is patterned; and
the polarization layer group is uniform.

7. The optical device of claim 1, wherein the substrate comprises a rigid, inert member that is transparent to a light flux incident on the stack.

8. The optical device of claim 1, wherein the polarization layer group is pixelated, and further comprising a detector array, wherein a pixel pitch of the pixelated polarization layer group is the same as or an integer multiple of a pixel pitch of the detector array.

9. The optical device of claim 1, wherein one of the retarder layer groups is pixelated, and further comprising a detector array, wherein a pixel pitch of the retarder layer group is the same as or an integer multiple of a pixel pitch of the detector array.

10. An optical device, comprising:
a substrate;
a color filter array;
first and second retarder layer groups forming a layer stack on the substrate, the first retarder layer group comprising a first alignment layer and a first liquid-crystal-polymer (LCP) layer, the first LCP layer including molecules aligned with molecules in the first alignment layer;
the second retarder layer group comprising a second alignment layer and a second LCP layer, the second LCP layer including molecules aligned with molecules of the second alignment layer;

a linear polarizer in the stack, wherein the optical device is pixelated and configured as an ambient light sensor, wherein each pixel is responsive to different respective polarization states of incident light in respective colors, wherein the polarization states are linear, elliptical and/or circular polarization states, and the linear polarizer in the stack is pixelated; and a detector array, wherein a pixel pitch of the linear polarizer in the stack is the same as or an integer multiple of a pixel pitch of the detector array.

11. The optical device of claim 10, wherein at least one of the first and second retarder layer groups is pixelated, wherein a pixel pitch of a pixelated retarder layer group is the same as or an integer multiple of the pixel pitch of the detector array.

12. An optical device, comprising:
a substrate;
first and second retarder layer groups forming a layer stack on the substrate, the first retarder layer group comprising a first alignment layer and a first liquid-crystal-polymer (LCP) layer, the first LCP layer including molecules aligned with molecules in the first alignment layer;
the second retarder layer group comprising a second alignment layer and a second LCP layer, the second LCP layer including molecules aligned with molecules of the second alignment layer;
at least a first barrier layer situated in the stack between the first and second retarder layer groups; and
a polarization layer group in the stack, the polarization layer group comprising a respective alignment layer and a respective LCP layer, the respective LCP layer including molecules aligned with molecules of the respective alignment layer, wherein the device is pixelated and configured as a color and polarization mask, wherein each pixel is arranged to generate different respective polarization states of light at different colors, wherein the polarization states are linear, elliptical, and/or circular polarization states.

13. The optical device of claim 12, further comprising an opaque patterned layer.

14. The optical device of claim 13, wherein the opaque patterned layer is situated on the substrate and the first and second retarder layer groups form the layer stack on the opaque patterned layer.

15. The optical device of claim 12, wherein the polarization layer group and at least one of the first and second retarder layer groups are pixelated.

16. The optical device of claim 12, further comprising a patterned and partially opaque layer.

17. The optical device of claim 12, further comprising a transparent patterned layer.

18. The optical device of claim 17, wherein the transparent patterned layer is situated on the substrate and the first and second retarder layer groups form the layer stack on the transparent patterned layer on the substrate.

19. The optical device of claim 12, wherein at least the polarization layer group or one of the retarder layer groups is pixelated and defines a device pixel pitch, and further comprising a detector array, wherein a pixel pitch of the retarder layer group is the same as or an integer multiple of the device pixel pitch.

20. An optical device, comprising:
a substrate;
a color filter array; and
first and second retarder layer groups forming a layer stack on the substrate, the first retarder layer group comprising a first alignment layer and a first liquid-crystal-polymer (LCP) layer, the first LCP layer including molecules aligned with molecules in the first alignment layer;
the second retarder layer group comprising a second alignment layer and a second LCP layer, the second LCP layer including molecules aligned with molecules of the second alignment layer;
a polarization layer group in the stack, the polarization layer group comprising a respective alignment layer and a respective LCP layer, the respective LCP layer including molecules aligned with molecules of the respective alignment layer, wherein the optical device is pixelated, wherein each pixel is responsive to different respective polarization states of incident light at different colors, wherein the polarization states are linear, elliptical, and/or circular polarization states, wherein at least the polarization layer group or at least one of the retarder layer groups is pixelated to define a pixel pitch of the optical device; and
a detector array, wherein the pixel pitch of the optical device is the same as or an integer multiple of a pixel pitch of the detector array.

* * * * *